(12) United States Patent
Thayer et al.

(10) Patent No.: US 12,136,294 B1
(45) Date of Patent: Nov. 5, 2024

(54) BIOMETRIC DATA PROCESSING FOR A SECURITY SYSTEM

(71) Applicant: SimpliSafe, Inc., Boston, MA (US)

(72) Inventors: Jordan Theodore Thayer, Hopkinton, MA (US); Daniel Reid Sundell, Medford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/392,164

(22) Filed: Dec. 21, 2023

Related U.S. Application Data

(60) Provisional application No. 63/584,020, filed on Sep. 20, 2023.

(51) Int. Cl.
| | | |
|---|---|---|
| *G06V 40/16* | (2022.01) | |
| *G06V 10/74* | (2022.01) | |
| *G06V 10/77* | (2022.01) | |
| *G06V 20/52* | (2022.01) | |

(52) U.S. Cl.
CPC .......... *G06V 40/172* (2022.01); *G06V 10/761* (2022.01); *G06V 10/7715* (2022.01); *G06V 20/52* (2022.01); *G06V 40/166* (2022.01); *G06V 40/178* (2022.01)

(58) Field of Classification Search
CPC .. G06V 40/172; G06V 20/52; G06V 10/7715; G06V 10/761; G06V 40/166; G06V 40/178

USPC ........................................................ 382/118
See application file for complete search history.

(56) References Cited

U.S. PATENT DOCUMENTS

| | | | |
|---|---|---|---|
| 9,876,788 B1* | 1/2018 | Ziraknejad | G06F 21/34 |
| 10,741,044 B1* | 8/2020 | Heintzelman | H04W 4/33 |
| 11,527,107 B1* | 12/2022 | Mostafa | G06V 10/751 |
| 2016/0063314 A1* | 3/2016 | Samet | G06F 21/31 |
| | | | 348/78 |
| 2018/0061158 A1* | 3/2018 | Greene | G06V 20/52 |
| 2019/0082149 A1* | 3/2019 | Correnti | G08B 13/19613 |
| 2019/0213309 A1* | 7/2019 | Morestin | G01S 17/04 |
| 2019/0278976 A1* | 9/2019 | Khadloya | G08B 13/19656 |
| 2019/0294900 A1* | 9/2019 | Li | G06V 40/70 |
| 2019/0364027 A1* | 11/2019 | Pande | G06F 21/316 |
| 2020/0309930 A1* | 10/2020 | Zhou | G01S 15/86 |
| 2021/0385417 A1* | 12/2021 | Park | G06F 3/0484 |
| 2022/0294780 A1* | 9/2022 | Suetsugu | H04L 63/0861 |
| 2022/0300753 A1* | 9/2022 | Bapat | H04N 7/18 |

\* cited by examiner

*Primary Examiner* — Kenny A Cese
(74) *Attorney, Agent, or Firm* — Pierce Atwood LLP

(57) ABSTRACT

A computing system may perform image processing on image data acquired by a camera at a property to determine at least a first feature of the image data. Based at least in part on a determination that the first feature satisfies a rule, the computing system may generate a vector representing a plurality of characteristics of a face represented in the image data. The vector may then be used to determine a particular person is represented in the image data.

24 Claims, 14 Drawing Sheets

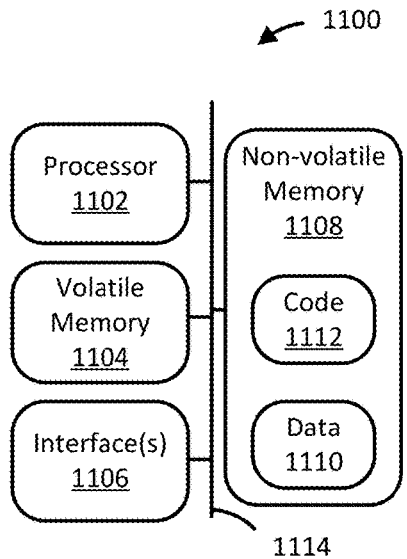
FIG. 11
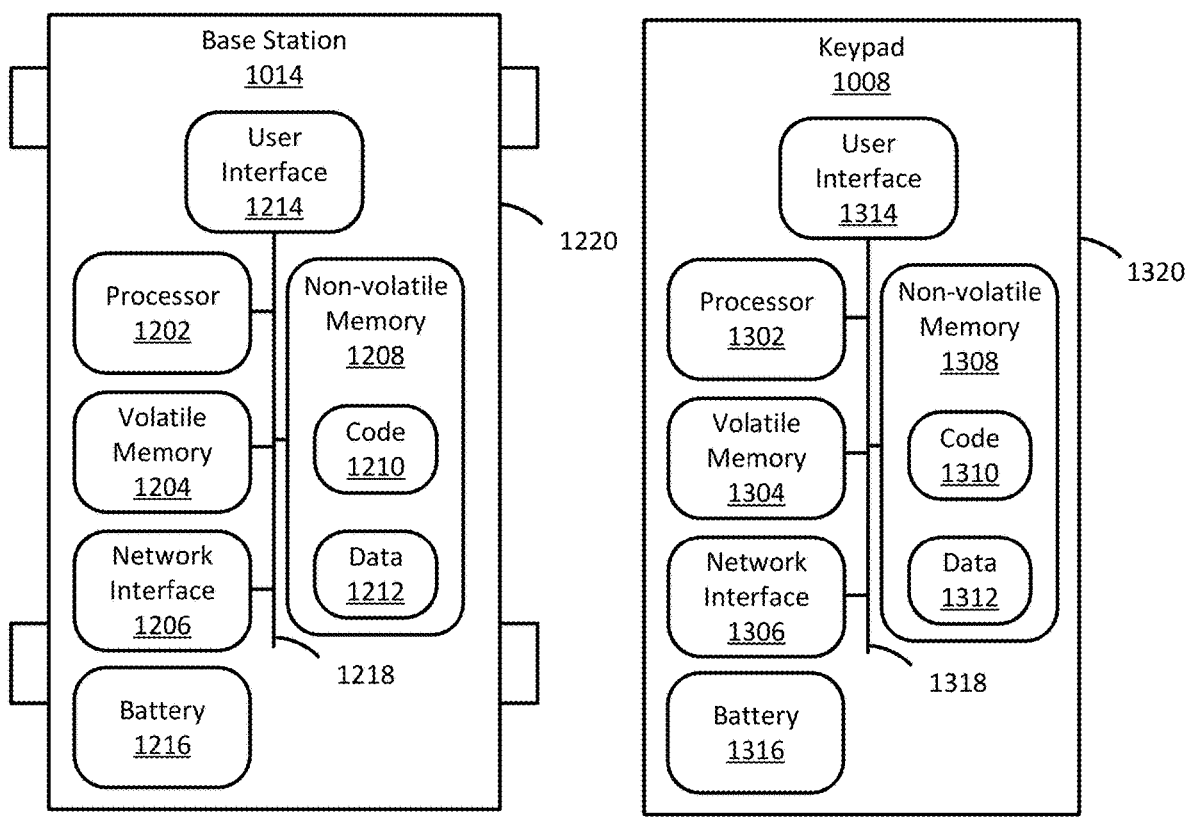
FIG. 12
FIG. 13

BIOMETRIC DATA PROCESSING FOR A SECURITY SYSTEM

CROSS-REFERENCE TO RELATED APPLICATIONS

This application claims the benefit under 35 U.S.C. § 119 (e) of U.S. Provisional Application No. 63/584,020, entitled BIOMETRIC DATA PROCESSING FOR A SECURITY SYSTEM, filed Sep. 20, 2023, the entire contents of which are hereby incorporated by reference for all purposes.

BACKGROUND

Some security systems enable remote monitoring of locations using cameras and other equipment.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 11 is a schematic diagram of a computing device that may be used to implement an endpoint device, a monitoring device, and/or one or more of the services of the of the security system shown in FIGS. 1 and 11, according to some implementations of the present disclosure.

FIG. 12 shows an example implementation of the base station of the security system shown in FIG. 10, according to some implementations of the present disclosure.

FIG. 13 shows an example implementation of the keypad of the security system shown in FIG. 10, according to some implementations of the present disclosure.

DETAILED DESCRIPTION

Figure 1:
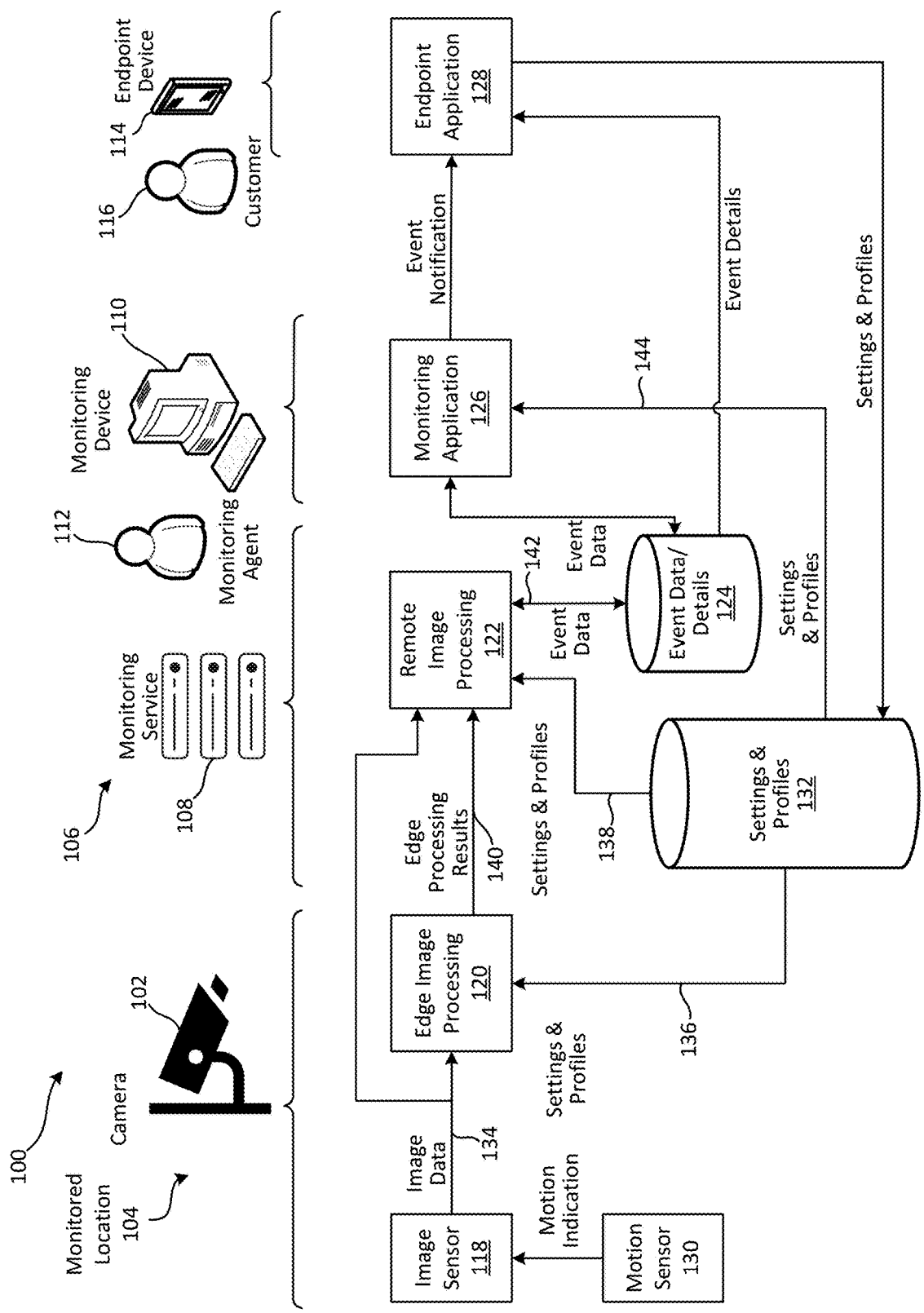
FIG. 1 shows an example security system in accordance with some implementations of the present disclosure.

Automated facial recognition techniques are used for various purposes, such as controlling access to smartphones. The use of biometric data for such purposes, however, is becoming increasingly regulated, e.g., by government entities, making it difficult for technology providers to take full advantage facial recognition technology. As used herein, "biometric data" refers to any data representing a physical or behavioral characteristic of a person that can be used for identification purposes. In a typical facial recognition system, various features of a face, such as the eyes, nose, and mouth, are pinpointed and measured in an image of the face to generate a feature vector. Such a feature vector may comprise an array of numerical values representing respective measured characteristics of the face. As a simple example, an image of a face can be mapped into a feature vector comprising numerical values representing various features like:

Height of face (cm)
Width of the face (cm)
Average color of face (R, G, B)
Width of lips (cm)
Height of nose (cm)

In such an example, where the height of the face is measured to be 23.2 cm, the width of the face is measured to be 14.9 cm, the average red, green and blue values of the face are measured to be 250, 221 and 173, respectively, the width of the lips is measured to be 5.1 cm, and the height of the nose is measured to be 3.9 cm, the feature vector for the face could be represented as (23.2, 14.9, 250, 221, 173, 5.1, 3.9). There are countless other features that could also be derived from the image and included in the feature vector for the face, such as features relating to eye shape, nose width, lip shape, hair color, eye socket depth, facial hair, eyeglasses, etc.

The feature vector that is so established may then be compared against a database of profiles containing feature vectors corresponding to faces of known individuals to attempt to find a match. Such a feature vector is sometimes referred to as a "biometric embedding," or simply an "embedding."

Regulations concerning the use of biometric data can vary significantly from location to location, making it challenging to design a system that is widely deployed and yet capable of complying with such disparate regulations. In existing security systems, devices typically need to be configured for the respective locales in which they might be deployed to ensure compliance with various regulatory schemas. There is an increasing need to customize device operation but still enable devices to be mass produced. Also, existing technology does not enable customers to tailor operations of their security systems to fit their individual desires for privacy.

Offered is a security system that includes various components and technical improvements designed to ensure that facial recognition technology is employed in a way that does not run afoul of regulations applicable a particular geographic region while at the same time providing the customer with the ability to control whether and how facial recognition technology is to be used in connection with their security system. In some implementations, for example, the system can employ one or more components to perform various checks prior to generating an embedding for a person's face that is represented in data acquired by a camera and/or storing data representing such a biometric embedding. Such checks may be used, for example, to identify one or more particular circumstances in which the system is to refrain from employing biometric facial recognition so as to avoid acquiring and/or storing embeddings in such circumstances. Examples of circumstances in which the system may refrain from employing biometric facial recognition include (A) a situation in which local regulations prohibit the uses of biometric facial recognition, (B) a situation in which the customer has opted out, or has not opted in, to the use of biometric facial recognition, (C) a situation in which a person (or face) detected in an image is greater than a threshold distance from the camera, (D) a situation in which a person (or face) detected in an image is outside the boundaries of the customer's property, and (E) a situation in which a person detected in an image is determined to be below a threshold age.

In some implementations, the system may additionally or alternatively employ one or more components to ensure consent is received from individuals (or their guardians if the individuals are minors) prior to generating and storing embeddings for faces of such individuals in visitor profiles that can be used to perform facial recognition. For example, in some implementations, the system may allow a customer to enter a unique identifier (e.g., user identifier, an email address, or phone number) for an individual for whom a visitor profile is being created and may solicit consent from that individual, e.g., via an email, a text message, a push notification to an application (e.g., the endpoint application 128 described below in connection with FIG. 1), etc., to generate biometric embeddings for the individual. Such a message may include, for example, a user interface element (e.g., a button saying "click here to consent" or the like) that can be selected to provide consent, or may instead include link to a web page or user interface (UI) screen of an application (e.g., the endpoint application 128) describing the requested consent and including a user interface element that can be selected to allow the individual to provide the requested consent. In some implementations, the system may store biometric data in a visitor profile for the individual only upon receipt the individual's consent.

In some implementations, the system may be configured to use a camera to acquire images of faces and/or to allow visitor profiles including facial images to be created without obtaining consent from the people involved, but the system may refrain from generating and/or storing biometric embeddings corresponding to such images unless certain conditions are met and/or consent is obtained, so as to ensure compliance with applicable regulations. As explained in more detail below, the acquisition and/or storage of face images in this fashion, even absent the generation of biometric embeddings for such images, may enable a monitoring agent to visually review the face images and other information from a visitor profile when reviewing recorded or live video for an event at a monitored location to determine whether or not particular individuals are authorized visitors.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 shows an example security system 100 in accordance with some implementations of the present disclosure. As shown, the security system 100 may include one or more cameras 102 disposed at a monitored location 104 (e.g., a residence, business, parking lot, etc.), a monitoring service 106 (e.g., including one or more servers 108) located remote from the camera(s) 102 (e.g., within a cloud-based service such as the surveillance center environment 102b described below in connection with FIGS. 10 and 15), one or more monitoring devices 110 operated by respective monitoring agents 112, and one or more endpoint devices 114 operated by respective customers 116. Although not illustrated in FIG. 1, it should be appreciated the various illustrated components may communicate with one another via one or more networks, e.g., one or more local area networks (LANs) and/or the internet.

The camera 102 may include, among other components, a motion sensor 130, an image sensor 118, and an edge image processing component 120. The monitoring service 106 may include, among other components, a remote image processing component 122, one or more datastores 124 for storing data about events detected by the security system 100 (e.g., within the event table 202 described below in connection with FIG. 2), and one or more datastores 132 for storing settings and profile information (e.g., within the settings table 302 and the profile table 402 described below in connection with FIGS. 3 and 4). The datastore(s) 124 may correspond, for example, to the location data store 1502 and/or the image data store 1504 described below in connection with FIG. 15. Although FIG. 1 illustrates the datastore(s) 132 as being located within the monitoring service 106, it should be appreciated that, in some implementations, the datastores(s) 132 (or one or more portions of the datastore(s) 132) may be located elsewhere in the security system 100, e.g., within the camera 102 or at another location proximate to the edge image processing component 120. The monitoring device 110 may include, among other components, a monitoring application 126 (e.g., executing on one or more processors of the monitoring device 110). Finally, the endpoint device 114 may include, among other components, a endpoint application 128 (e.g., executing on one or more processors of the endpoint device 114).

As shown in FIG. 1, in some implementations, one or more of the remote image processing component 122, the monitoring application 126, and the endpoint application 128 may be in communication with the datastore(s) 124, e.g., via one or more networks such as the network 1020 described below in connection with FIGS. 10 and 15. Similarly, in some implementations, one or more of the edge image processing component 120, the remote image processing component 122, the monitoring application 126, and the endpoint application 128 may be in communication with the datastores 132, e.g., via one or more networks such as the network 1020 described below in connection with FIGS. 10 and 15. For example, in some implementations, the monitoring service 106 or another component within the surveillance center environment 1026 (see FIGS. 10 and 15) may provide one or more application programming interfaces (APIs) that can be used by the edge image processing component 120, the remote image processing component 122, the monitoring application 126, and/or the endpoint application 128 to write data to the datastore(s) 124, 132 and/or fetch data from the datastore(s) 124, 132, as needed.

As illustrated in FIG. 1, the image sensor 118 may acquire image data (e.g., digital data representing one or more acquired frames of pixel values) from the monitored location 104 and, an indicated by an arrow 134, may pass that image data to the edge image processing component 120 and/or the remote image processing component 122 for processing. In some implementations, for example, the motion sensor 130 may detect motion at the monitored location 104 and provide an indication of the detected motion to the image sensor 118. The motion sensor 130 may, for example, be a passive infrared (PIR) sensor. In response to the indication of detected motion, the image sensor 118 may begin acquiring frames of image data from within the camera's field of view. In some implementations, the image sensor 118 may continue collecting frames of image data until no motion is detected by the motion sensor 130 for a threshold period of time (e.g., twenty seconds). As a result, the image data acquired by the image sensor 118 may represent a video clip of a scene within the camera's field of view that begins when motion was first detected and ends after motion has ceased for the threshold period of time. In some implementations, the camera 102 may be configured to emit a flashing light and/or generate an audible sound to indicate that the camera 102 is recording and processing video and audio.

In some implementations, rather than relying upon a motion sensor 130 (e.g., a PIR sensor) to trigger the collection of frames of image data, the camera 102 may instead continuously collect frames of image data and rely upon one or more image processing modules (e.g., machine learning (ML) models and/or other computer vision (CV) processing components) of the edge image processing component 120 to process the collected frames to detect motion within the field of view of the camera 102. Accordingly, in such implementations, rather than relying upon a motion indication provided by a motion sensor 130 to determine the start and end of a video clip for further processing, the camera 120 may instead rely upon a motion indication provided by such image processing module(s) for that purpose.

The edge image processing component 120 may include one or more first image processing modules (e.g., ML models and/or other CV processing components) configured to identify respective features within the image data, and the remote image processing component 122 may include one or more second, different image processing modules (e.g., ML models and/or other CV processing components) configured to identify respective features within the image data. The first and/or second image processing modules may, for example, be configured to perform processing on the image data to detect motion, to identify people, to identify faces, to perform facial recognition, etc. In some implementations, for example, motion may be detected by using one or more functions of the OpenCV library (accessible at the uniform resource locator (URL) "opencv.org") to detect meaningful difference between frames of image data. One example of an ML model that may be used for person detection is YOLO (accessible via the URL "github.com"). One example of an ML model that may be used for face detection is RetinaFace (accessible via the URL "github.com"). One example of an ML model that may be used for facial recognition is AdaFace (accessible via the URL "github.com").

In some implementations, the processing power of the server(s) 108 employed by the monitoring service 106 may be significantly higher than that of the processor(s) included in the edge image processing component 120, thus allowing the monitoring service 106 to employ more complex image processing modules and/or to execute a larger number of such image processing modules in parallel.

The edge image processing component 120 and/or remote image processing component 122 may include one or more image processing modules that are configured to perform facial recognition on the image data acquired by the image sensor 102. For instance, the edge image processing component 120 and/or the remote image processing component 122 may generate an embedding for an image representing a face of a person and compare that embedding with embeddings for various individuals stored by the datastore(s) 132 (e.g., as biometric embeddings 416 of the profile table 402, as described below). In some implementations, the edge image processing component 120 and/or remote image processing component 122 may determine that the generated embedding matches or otherwise corresponds to a stored embedding when the two embeddings are within a threshold degree of similarity of one another.

As indicated by arrows 136 and 138 in FIG. 1, the edge image processing component 120 and/or the remote image processing component 122 may access the datastore(s) 132 to obtain settings (e.g., customer settings) from the settings table 302 (shown in FIG. 3) and one or more profiles (e.g., visitor profiles) from the profile table 402 (shown in FIG. 4) for such purposes. The profiles that are to be accessed for a particular customer 116 may be identified, for example, via the "visitor profiles" entries 310 in the settings table 302. The data obtained from the settings table 302 may additionally include biometric settings 312 for the customer 116. As explained below in connection with FIG. 8, in some implementations, such biometric settings 312 may be used by the edge image processing component 120 and/or the remote image processing component 122 to determine whether and/or how to perform facial recognition using the image data acquired by the image sensor 118. Further, as described below in connection with FIGS. 7A and 9A in some implementations, the endpoint application 128 may be configured to enable the customer 116 to create and/or modify visitor profiles stored in the profile table 402 and/or to set or adjust biometric settings 312 stored in the settings table 302.

In some implementations, the edge image processing component 120 may include one or more components configured to determine, based on the biometric settings and one or more features of the acquired image data, whether and/or how to perform facial recognition processing using the image data. An example process 800 that may be executed by the edge image processing component 120 to make such a determination is described below in connection with FIG. 8. In such implementations, when the edge image processing component 120 determines that biometric facial recognition is to be performed on one or more images represented in the acquired image data, the edge image processing component 120 may generate biometric embeddings for such image(s) and include those biometric embeddings in edge processing results (see arrow 140 in FIG. 1) that are sent to the remote image processing component 122. One or more components of the remote image processing component 122 may then use the determined biometric embeddings to perform facial recognition, such as by comparing them against biometric embeddings 414 from one or more visitor profiles. In some implementations, the remote image processing component 122 may store the determined biometric embeddings for the event, e.g., as biometric embeddings 216 in the event table 202 (per arrow 142 in FIG. 1), prior to comparing them against biometric embeddings 414 from one or more visitor profiles. In other implementations, the remote image processing component 122 may compare the determined biometric embeddings against the biometric embeddings 414 from visitor profiles prior to storing the determined embeddings in the event table 202. In some implementations, the determined biometric embeddings may be stored in the event table 202 only if a matching biometric embedding 414 is identified in a profile (e.g., a visitor profile). In some implementations, the remote image processing component 122 may discard the determined biometric embeddings after comparing them against the biometric embeddings 414 from the visitor profile(s) and may thus refrain from storing them in the event table 202 at all.

In some implementations, the remote image processing component 122 may additionally or alternatively include one or more components configured to determine, based on the biometric settings and one or more features of the acquired image data, whether and/or how to perform facial recognition processing (e.g., by using a biometric embedding to identify a face in an image) using the image data acquired for an event. In such implementations, the process 800 (shown in FIG. 8) may additionally or alternatively be executed by the remote image processing component 122. In such implementations, when the remote image processing component 122 determines that biometric facial recognition is to be performed on one or more images represented in the acquired image data, the remote image processing component 122 may generate biometric embeddings for such image(s). One or more components of the remote image processing component 122 may then use the determined biometric embeddings to perform facial recognition, such as by comparing them against biometric embeddings 414 from one or more profiles. In some implementations, the remote image processing component 122 may store the determined biometric embeddings for the event, e.g., as biometric embeddings 216 in the event table 202 (per the arrow 142 in FIG. 1), prior to comparing them against biometric embeddings 414 from one or more profiles. In other implementations, the remote image processing component 122 may compare the determined biometric embeddings against the biometric embeddings 414 from profiles prior to storing the determined embeddings in the event table 202. In some implementations, the determined biometric embeddings may be stored in the event table 202 only if a matching biometric embedding 414 is identified in a profile. In some implementations, the remote image processing component 122 may discard the determined biometric embeddings after comparing them against the biometric embeddings 414 from the visitor profile(s) and may thus refrain from storing them in the event table 202 at all.

As indicated by an arrow 144 in FIG. 1, in some implementations, the monitoring application 126 operated by the monitoring agent 112 may also receive the customer settings from of the settings table 302 and at least some data from the profile table 402 (e.g., one or more images 412 of profiled persons and identifiers 408, 410 of locations that such persons are authorized or not authorized to visit, as described below). The monitoring application 126 may use such information, for example, to display images of authorized (or unauthorized) individuals at a monitored location 104 together with an image of a face detected by the edge image processing component 120 and/or the remote image processing component 122, to enable the monitoring agent 112 to visually compare the detected face with the faces of the authorized (or unauthorized) individuals, even if the edge image processing component 120 and/or the remote image processing component 122 did not perform facial recognition processing for the detected face.

As indicated by the arrow 142 in FIG. 1, after the remote image processing component 122 has detected and/or confirmed the presence of one or more pertinent features (e.g., motion, people, faces, etc.) within the image data acquired by the image sensor 130, the remote image processing component 122 may upload the image data as well as data reflecting the identified features (collectively "event data") to the datastore(s) 124 (e.g., to a row of the event table 202) for further review (e.g., by a monitoring agent 112 operating a monitoring application 126 and/or a customer 116 operating a endpoint application 128). In other implementations, image data (e.g., video corresponding to motion detected by the motion sensor 130) may be uploaded to the datastore(s) 124 (e.g., to respective rows of the event table 202) as it is acquired, and the remote image processing component 122 may simply supplement the uploaded image data (e.g., by populating one or more columns of the event table 202) with data concerning the feature(s) the remote image processing component 122 identifies.

Figure 2:
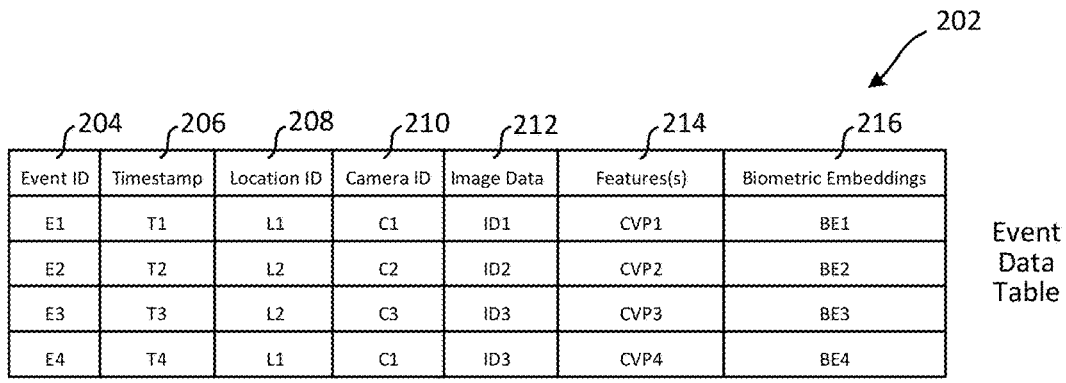
FIG. 2 shows an example table that may be used by the security system shown in FIG. 1 to store data related events, according to some implementations of the present disclosure.

FIG. 2 shows an example event table 202 that may be used to store the event data for various events detected by the system 100. As shown, for individual events, the event table 202 may be populated with data representing, among other things, an event identifier (ID) 204, a timestamp 206, a location ID 208, a camera ID 210, image data 212, one or more feature predictions 214, and one or more biometric embeddings 216.

The event IDs 204 may represent the different events that the security system 100 has detected, and the data in the same row as a given event ID 204 may correspond to that same event.

The timestamps 206 may indicate the date and time at which the corresponding event was detected.

The location IDs 208 may identify the monitored location 104 at which the event was detected.

The camera IDs 210 may identify the cameras 102 that are associated with the corresponding detected events.

The image data 212 may represent one or more images (e.g., snapshots or video) that were acquired by the camera 102 identified by the corresponding camera ID 210 when the event was detected.

The feature prediction(s) 214 may include information concerning one or more features identified by the edge image processing component 120 and/or the remote image processing component 122. Such information may include, for example, indicators of detected motion during the event, indicators of detected people corresponding to the event, indicators of detected faces corresponding to the event, indicators of recognized faces corresponding to the event (e.g., using facial recognition processing performed by the edge image processing component 120 and/or the remote image processing component 122), a threat level assigned to the event, etc.

The biometric embeddings 216 may represent embeddings generated for faces represented in the image data 212. As described in more detail below, in some implementations, such embedding may be generated only under certain circumstances and/or only when certain conditions are satisfied, to ensure compliance with local regulations, etc. Further, in some implementations, even in circumstances where embeddings are generated for an acquired image, such embeddings may be stored in the event table 202 only in certain cases, such as when a matching biometric embedding 414 is identified in a visitor profile (e.g., by comparing the biometric embeddings 216 of the acquired image with the biometric embeddings 414 of a visitor profile). Storing the biometric embeddings 216 for an acquired image in such a circumstance may be useful, for example, as ground truth data for subsequent training or retraining one or more image processing modules used for facial recognition.

Although not illustrated in FIG. 2, it should be appreciated that the event table 202 may additionally include other data that can be used for various purposes, such as facilitating the assignment of events to particular agents, descriptions of the events (e.g., "Back Yard Camera Detected Motion"), alarm statuses for the monitored locations 104, one or more recorded audio tracks associated with the events, status changes of one or more sensors (e.g., door lock sensors) at monitored locations 104, recording actions taken by, or decisions made by, a monitoring agent 112 while revieing an event, etc. As described in more detail below in connection with FIG. 6, in some implementations, some such data may be used to populate one or more event data windows 608 that can be displayed by a monitoring device 110, together with one or more live video feeds within the video feed window(s) 604 and/or the main viewer window 606.

Notifications concerning "actionable" events represented in the event table 202 (e.g., events for which the remote image processing component 122 identified one or more features of interest) may be dispatched to respective monitoring applications 126 for review by monitoring agents 112. In some implementations, the monitoring service 106 may use the contents of the event table 202 to assign individual events to various monitoring agents 112 with monitoring applications 126. The monitoring application 126 operated by a given monitoring agent 112 may then add the events assigned to that monitoring agent 112 to a queue of events for review by that monitoring agent 112.

Figure 5:
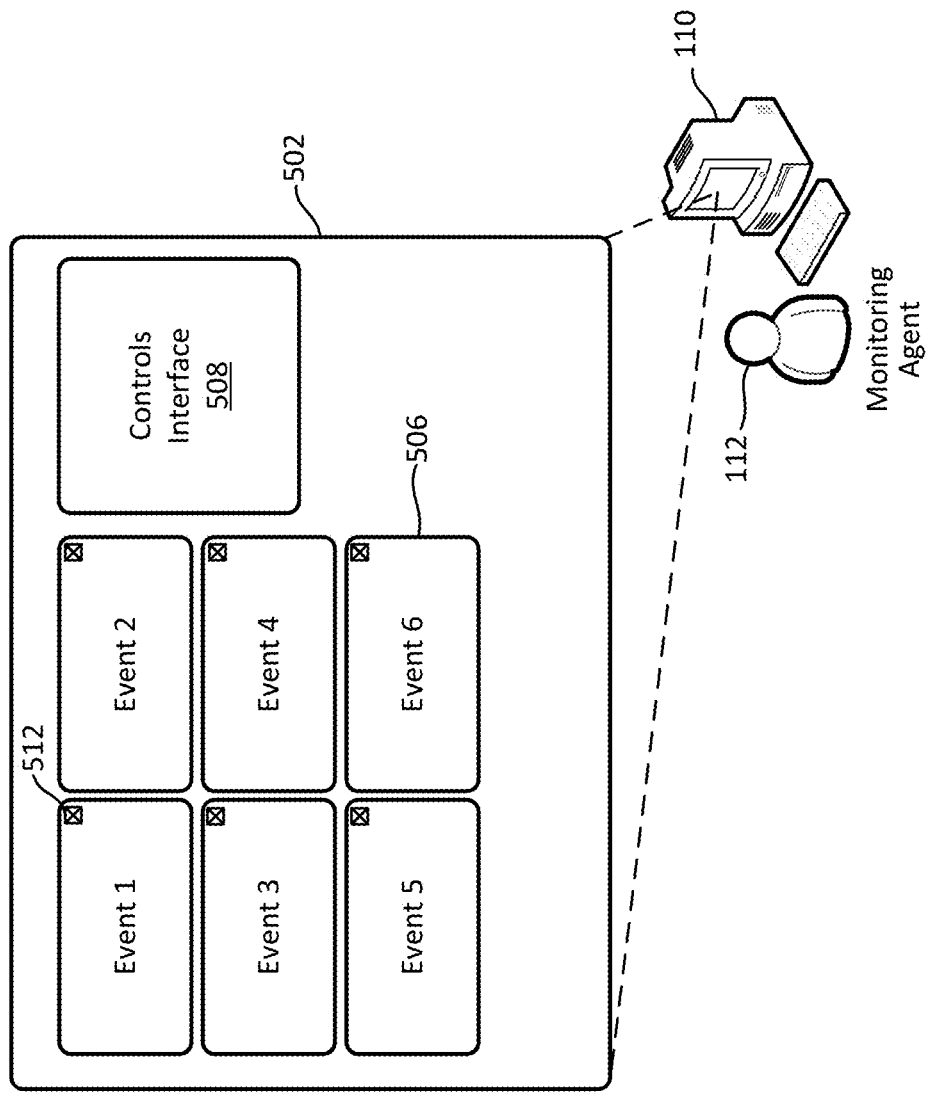
FIG. 5 shows a first example screen that may be presented on the monitoring device of the security system shown in FIG. 1, according to some implementations of the present disclosure.

FIG. 5 shows an example screen 502 that may be presented on a monitoring device 110 of the security system 100. As shown, the monitoring device 110 may be operated by a monitoring agent 112, and the screen 502 may include a set of windows 506 corresponding to respective events that are currently in the monitoring agent's queue for review. In some implementations, for example, the individual windows 506 may be configured to play back recorded video corresponding to respective events that were detected at various monitored locations 104. As used herein, a "monitored location" may correspond to a particular location (e.g., a house and associated lot, an office space, a parking lot, etc.) that is monitored for security or other purposes. A given monitored location 104 may, for example, be associated with a particular customer (e.g., via a customer ID). In some implementations, the recorded video may, at least initially, be configured and/or played back at an increased rate (e.g., two times standard speed) to increase the rate at which monitoring agents 112 can review the video for potential threats or objects of interest.

As shown in FIG. 5, in some configurations, the screen 502 may include a controls interface 508 that includes one or more user interface (UI) elements to allow the monitoring agent 112 to control various aspects of that agent's queue, such as a maximum number of notifications that can be added to the agent's queue for presentation in respective windows 506. In some implementations, notifications about events may be distributed to individual monitoring agents 112, who are included in a pool of available monitoring agents 112, so that all of the available monitoring agents 112 have roughly the same number of events/notifications in their review queue at a given time.

Upon reviewing one of the windows 506, e.g., by viewing a recorded video clip corresponding to detected motion, the monitoring agent 112 may determine that no potential security threat exists and provide an input instructing monitoring application 126 to cause the notification indicative of that event to be removed from the agent's review queue, thus freeing up the corresponding window 506 to display another event/notification. Such an input may, for example, involve selecting (e.g., clicking on) a close element 512 of a window 506.

Alternatively, upon reviewing one of the windows 506, e.g., by viewing a recorded video clip corresponding to detected motion, the monitoring agent 112 may determine that a potential threat or other security concern (referred to herein as an "incident") exists and determine that further review is warranted. In such a circumstance, the monitoring agent 112 may click on or otherwise select the window 506 in which the recorded video in question is being displayed. In response to such a selection, the monitoring device 110 may begin to receive live video and/or audio (i.e., video and/or audio corresponding to events that are currently occurring) streamed from one or more cameras at the monitored location 104 and/or the monitoring agent 112 may otherwise be provided with additional data (e.g., recorded video and/or audio, still images, sensor data, artificial intelligence (AI) evaluation results from the edge image processing component 120 and/or the remote image processing component 122, etc.) enabling the monitoring agent 112 to evaluate whether the incident presents an actual security risk. In some implementations, for example, one or more peer-to-peer connections may be established between one or more cameras 102 at the monitored location 104 and the monitoring device 110, e.g., using web real-time communication (WebRTC) functionality of a browser on the monitoring device 110, to enable the streaming of video data and/or audio data between such camera(s) 102 and the monitoring device 110.

Figure 6:
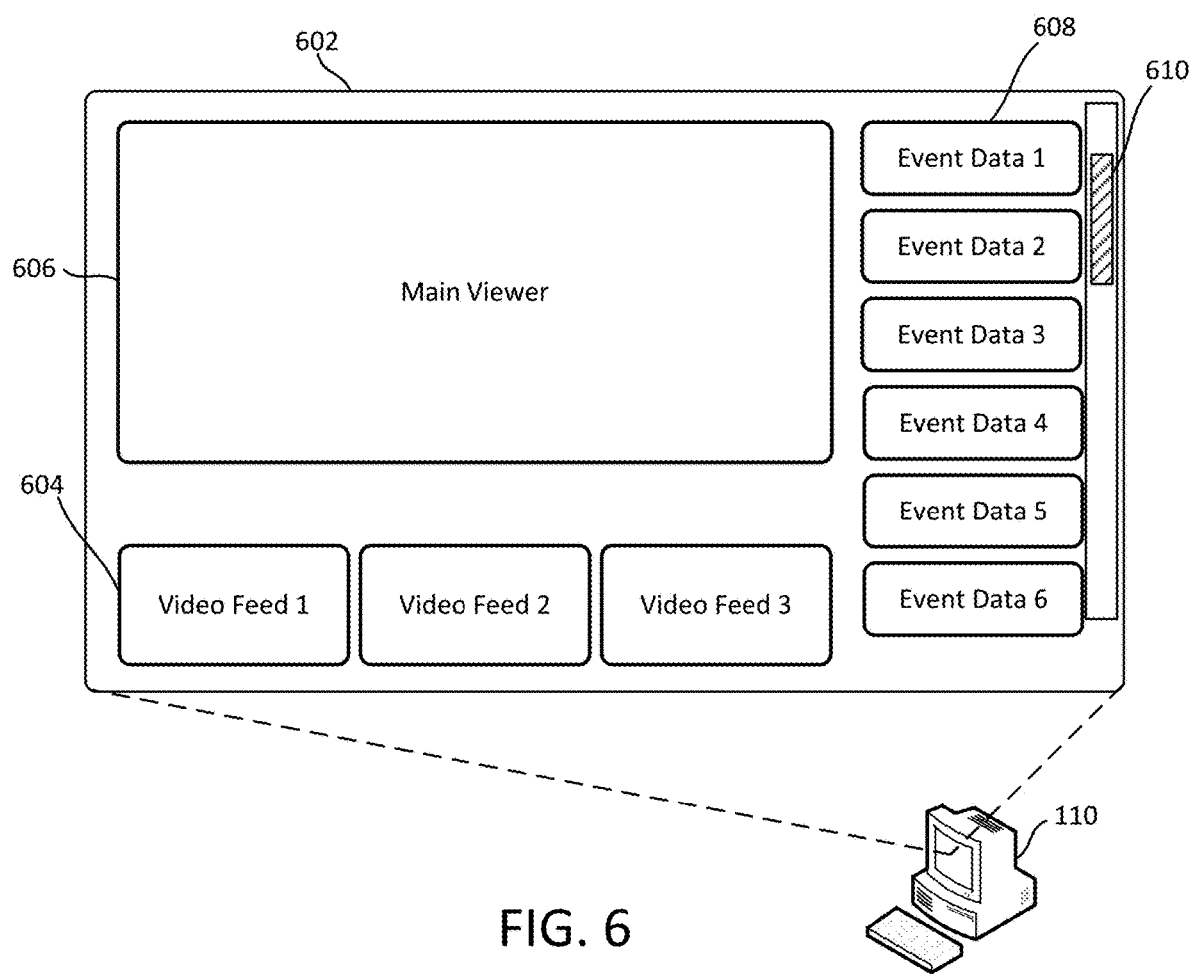
FIG. 6 shows a second example screen that may be presented on the monitoring device of the security system shown in FIG. 1, according to some implementations of the present disclosure.

FIG. 6 shows an example screen 602 that may be presented by the monitoring device 110 in response to selection of one of the windows 506 shown in FIG. 5. In the illustrated example, the screen 602 includes three video windows 604 configured to display streamed video feeds from three different cameras 102 at the monitored location 104 corresponding to the selected window 506. Although not illustrated in FIG. 6, controls may additionally or alternatively be provided to allow the monitoring agent 112 to listen to streamed audio from the corresponding camera(s) 102 as well as to speak into a microphone so as to cause one or more speakers of such camera(s) 102 to output audio representing to the monitoring agent's voice. In the illustrated example, the screen 602 also includes a larger, main viewer window 606 in which the streamed video for one of the windows 604 may optionally be played, thus making it easier for the monitoring agent 112 to see the content of the video. In some implementations, the monitoring agent 112 may cause the streamed video from a particular camera 102 to be played in the main viewer window 606 by selecting the window 604 for that camera, e.g., by clicking on it.

As shown in FIG. 6, in some implementations, the monitoring application 126 may cause the screen 602 of the monitoring device 110 to present one or more other windows 608 containing additional information concerning the event. Such additional information may include, for example, image frames that were identified by the edge image processing component 120 and/or the remote image processing component 122 as including features of interest (e.g., motion, people, faces, recognized faces, etc.), indications of outputs from other sensors (e.g., door sensors, glass break sensors, motion sensors, smoke detectors, etc.) at the monitored location 104, images of individuals authorized to be at the monitored location 104, etc. Further, as also illustrated, in some implementations, the monitoring application 126 may cause the screen 602 of the monitoring device 110 to present a scroll bar 610 that a monitoring agent 112 can manipulate, e.g., to access and review additional windows 608 that cannot fit within the display region of the monitoring device 110.

The monitoring agent 112 may take an appropriate action based on a review of the live video and/or audio from the camera(s) 102. If the monitoring agent 112 determines that no security issue exists, the monitoring agent 112 may cancel the event notification (e.g., by clicking on or otherwise selecting a "cancel" button—not illustrated), thus causing it to be removed from that agent's queue.

If, on the other hand, the monitoring agent 112 continues to believe, based on a review of the live video and/or audio from the camera(s) 102, that a threat or other security issue may exist, the monitoring agent 112 may instead determine to continue evaluating the event, such as by verbally communicating with one or more individuals at the monitored location 104, e.g., via a speaker on a camera 102.

Upon further review by the monitoring agent 112, interaction with one or more individuals at the monitored location 104, etc., the monitoring agent 112 may determine a disposition of the event and possibly take one or more remedial measures, such as dispatching the police or fire department to the monitored location 104.

Further, in some implementations, the monitoring application 126 may prompt the monitoring agent 112 to send one or more follow-up communications (e.g., an email, a push notification, a text message, etc.) to the customer 116 describing the event and its disposition. In some implementations, the monitoring application 126 may additionally prompt the monitoring agent 112 to select one or more key frames including features identified by the edge image processing component 120 and/or the remote image processing component 122 (e.g., by using toggle switches to select such items amongst the windows 608), and may append the selected frame(s) and indications of the feature(s) to the notification that is sent to the customer 116.

In some implementations, the monitoring application 126 may also present user interface elements (e.g., toggle switches) allowing the monitoring agent 112 to flag frames identified by the edge image processing component 120 and/or the remote image processing component 122 as having including incorrect or inaccurate feature identifications, and the data that is so collected may subsequently be used to retrain the edge image processing component 120 and/or the remote image processing component 122.

Figure 3:
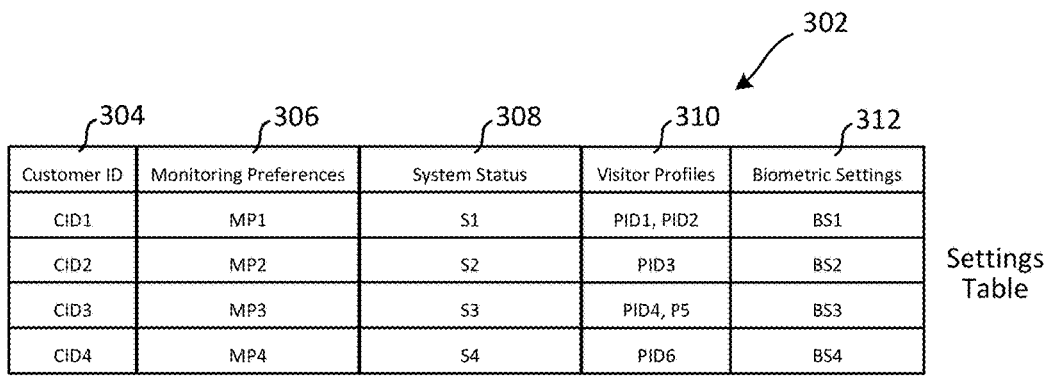
FIG. 3 shows an example table that may be used by the security system shown in FIG. 1 to store customer-specific settings, according to some implementations of the present disclosure.

Referring to FIG. 3, the settings table 302 may include configuration data for respective customers 116, e.g., as indexed by customer IDs 304. As illustrated, the settings table 302 may include, among other things, monitoring preferences 306, system status indicators 308, visitor profile identifiers 310, and biometric settings 312.

The monitoring preferences 306 may represent various settings for controlling the manner in which monitoring is performed by the security system 100, such as the properties that are to be monitored, the camera(s) 102 that are to be used to perform such monitoring, the type(s) of monitoring that is to be performed, the times of day during which such monitoring is to occur, etc. As explained below in connection with FIG. 8, in some implementations, the monitoring preferences may be referenced by the edge image processing component edge image processing component 120 and/or the remote image processing component 122 when determining whether to generate biometric embeddings in a particular circumstance (e.g., at a particular time of day).

The system status indicators 308 may identify the current status of the security system 100, such as whether the system is "armed," "disarmed," or "off." As explained below in connection with FIG. 8, in some implementations, the system status indicator 308 may be referenced by the edge image processing component edge image processing component 120 and/or the remote image processing component 122 when determining whether to generate biometric embeddings in a particular circumstance, such as by determining to perform biometric facial recognition only when the system is in an "armed" state.

The identifiers 310 may identify one or more visitor profiles in the profile table 402. As indicated, in some implementations, such visitor profiles may be identified by listing the person IDs 404 that are used to index those visitor profiles in the profile table 402.

The biometric settings 312 may be used to indicate whether biometric facial recognition is enabled for one or more properties of customer 116. An example process for determining the biometric settings for a given property is described below in connection with FIG. 7A.

Figure 4:
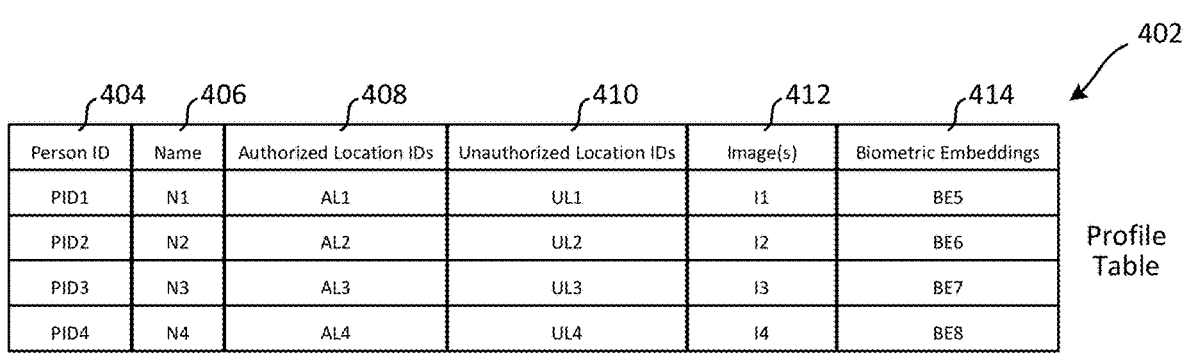
FIG. 4 shows an example table that may be used to store profile data for various individuals that can be used by the security system shown in FIG. 1 to perform biometric facial recognition, according to some implementations of the present disclosure.

Referring to FIG. 4, the table 402 may include profile data for various individuals that can be used by the edge image processing component 120 and/or the remote image processing component 122 to perform biometric facial recognition, or that may be used by the monitoring application 126 to allow monitoring agent 112 to view images of individuals who are authorized or not authorized to visit particular monitored locations 104. As noted previously, the table 402 may be indexed using respective person IDs 404. As illustrated, the table 402 may include, among other things, names 406 of the individuals for whom the visitor profiles were created, authorized location IDs 408 that identify one or more locations that the individual is authorized to visit, unauthorized location IDs 410 that identify one or more locations that the individual is not authorized to visit, one or more images 412 of the individual's face, and biometric embeddings 414 that have been generated for one or more of the image(s) 412.

Figure 7A:
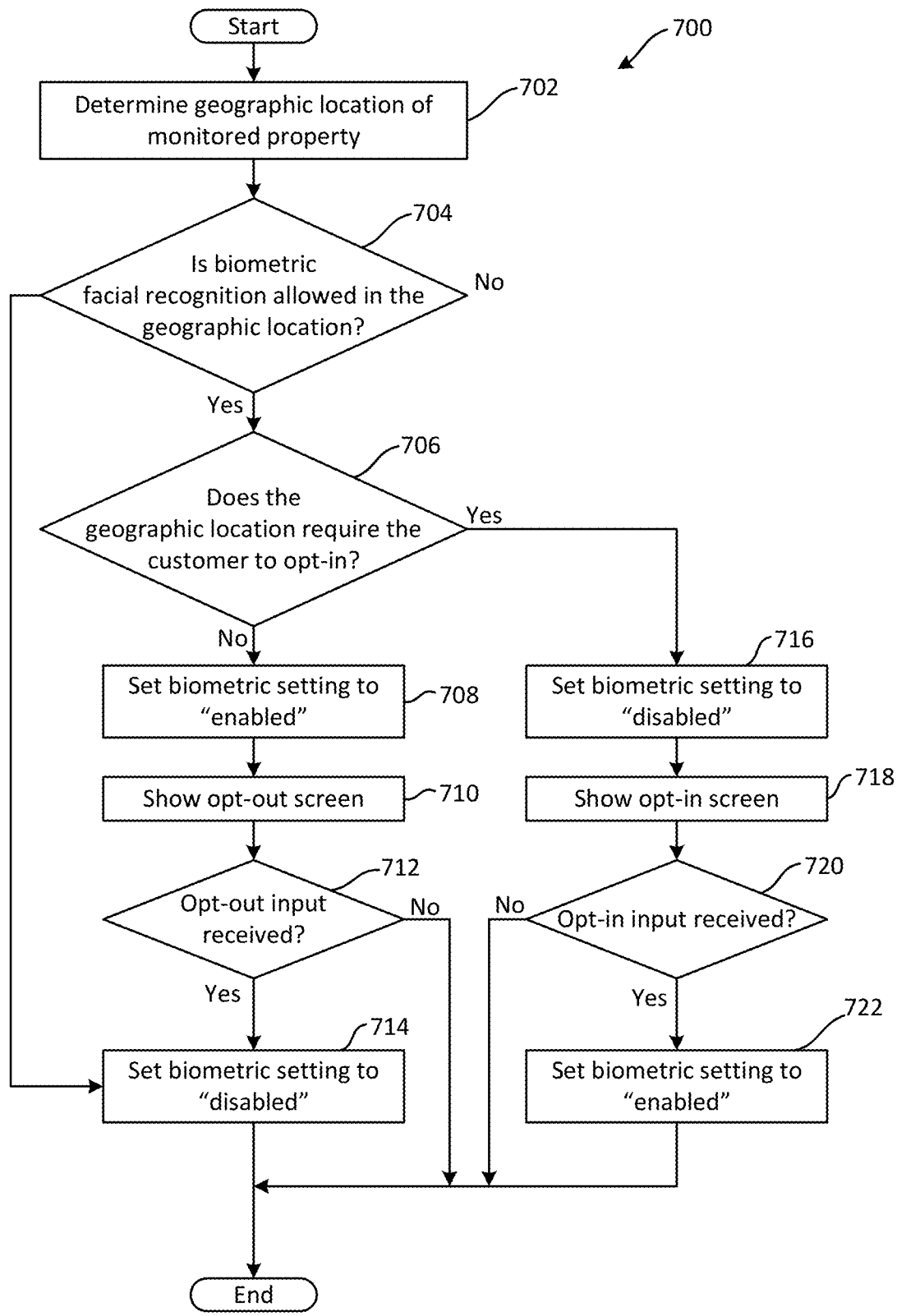
FIG. 7A shows an example process that may be performed by the endpoint application shown in FIG. 1 to determine biometric settings for a given property, according to some implementations of the present disclosure.

FIG. 7A shows an example process 700 that may be executed by one or more components of the security system 100, e.g., the endpoint application 128, to determine a biometric setting 312 in the settings table 302 (see FIG. 3) for a particular monitored location 104.

As shown, the process 700 may begin at a step 702, at which the endpoint application 128 may determine the geographic location of the property that is to be monitored. As described below, the application 128 may thereafter use the determined geographic location to apply one or more rules or criteria (e.g., using a rules engine, logic components, or otherwise) relating to the use of biometric facial recognition in that location. The geographic location may be determined, for example, based on a zone improvement plan (ZIP) code, city and/or state identified by the endpoint device 114 during a set up process and/or using location data determined using a global positioning system (GPS) component of the endpoint device 114.

At a decision 704 of the process 700, the endpoint application 128 may apply a rule to determine whether biometric facial recognition is allowed in the geographic region determined at the step 702. In some implementations, for example, the endpoint application 128 may consult a database (not illustrated) that identifies geographic locations (e.g., using ZIP codes, cities, states, and/or GPS coordinates) in which biometric facial recognition is prohibited to determine whether the determined geographic region is identified in that database. Alternatively, the endpoint application 128 may consult a database (not illustrated) that identifies geographic locations (e.g., using ZIP codes, cities, states, and/or GPS coordinates) in which biometric facial recognition is allowed to determine whether the determined geographic region is identified in that database. In either case, the consulted database may be updated periodically or occasionally (e.g., by a system administrator or using an automated process) to ensure that it accurately identifies geographic locations in which biometric facial recognition is prohibited or allowed. In some implementations, the database that is consulted to make the decision 704 may be disposed within the surveillance center environment described below in connection with FIGS. 10 and 15.

When, at the decision 704, the endpoint application 128 determines that biometric facial recognition is not allowed in the geographic region, the process 700 may proceed to a step 714, at which the endpoint application 128 may set the biometric setting 312 for the monitored location 104 to "disabled." In some implementations, for example, the endpoint application 128 may be configured to call an API of a component that manages the datastore(s) 132 to selectively set the biometric settings 312 in the settings table 302 to either "enabled" or "disabled."

When, at the decision 704, the endpoint application 128 determines that biometric facial recognition is allowed in the geographic region, the process 700 may instead proceed to a decision 706, at which the endpoint application 128 may apply another rule to determine whether the geographic location determined at the step 702 requires the customer 116 to opt-in to the use of biometric facial recognition before that technology can be deployed at the monitored location 104. Similar to the decision 704, in some implementations, the endpoint application 128 may make such a determination by consulting a database (not illustrated) that identifies geographic locations (e.g., using ZIP codes, cities, states, and/or GPS coordinates) at which customer opt-in consent is required to determine whether the determined geographic region is identified in that database. Alternatively, the endpoint application 128 may consult a database (not illustrated) that identifies geographic locations (e.g., using ZIP codes, cities, states, and/or GPS coordinates) at which customer opt-in consent is not required to determine whether the determined geographic region is identified in that database. In either case, the consulted database may be updated periodically or occasionally (e.g., by a system administrator or using an automated process) to ensure that it accurately identifies geographic locations in which opt-in consent is required or not required. In some implementations, the database that is consulted to make the decision 706 may be disposed within the surveillance center environment described below in connection with FIGS. 10 and 15.

Figure 7B:
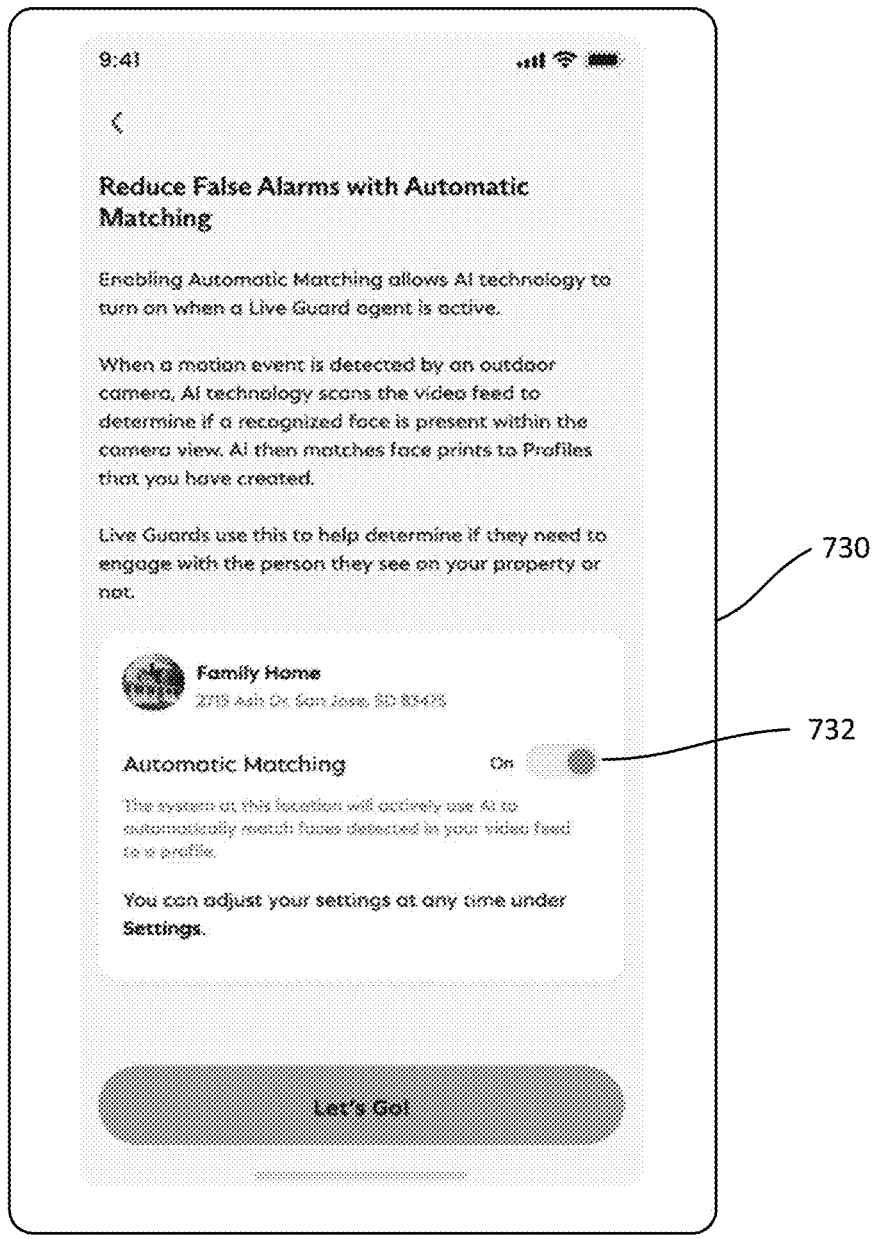
FIG. 7B shows an example of an opt-out screen that may presented on the endpoint device shown in FIG. 1 during execution of the process shown in FIG. 7A, according to some implementations of the present disclosure.

When, at the decision 706, the endpoint application 128 determines that the geographic location does not require the customer 116 to opt-in to the use of biometric facial recognition before that technology can be deployed at the monitored location 104, the process 700 may proceed to a step 708, at which the endpoint application 128 may preliminarily set the biometric setting 312 (in the settings table 302) for the monitored location 104 to "enabled." Following the step 708, the process 700 may proceed to a step 710 at which the endpoint application 128 may present an opt-out screen to provide the customer 116 with an option for opting-out of the use of facial recognition technology. An example of an opt-out screen 730 that may be presented on the endpoint device 114 via the endpoint application 128 is shown in FIG. 7B. As shown in FIG. 7B, the screen 730 may include user interface element (e.g., a toggle switch 732) that indicates that the biometric facial recognition is enabled for the monitored location 104, but that may be manipulated to disable biometric facial recognition for the monitored location 104, e.g., by changing the state of the toggle switch 732 or otherwise interacting with one or more user interface elements (e.g., radio buttons or the like).

When, at a decision 712, the endpoint application 128 determines that an opt-out input has been received (e.g., by determining that the customer 116 has changed the state of the toggle switch 732), the process 700 may proceed to the step 714, at which the endpoint application 128 may set the biometric setting 312 for the monitored location 104 to "disabled," e.g., by making an API call to the monitoring service 106 to change the value of the biometric setting 312 for the monitored location 104 in the settings table 302 of the datastore 132 to "disabled."

When, at the decision 706, the endpoint application 128 determines that the geographic location requires the customer 116 to opt-in to the use of biometric facial recognition before that technology can be deployed at the monitored location 104, the process 700 may instead proceed to a step 716, at which the endpoint application 128 may preliminarily set the biometric setting 312 (in the settings table 302) for the monitored location 104 to "disabled," e.g., by making an API call to the monitoring service 106 to change the value of the biometric setting 312 for the monitored location 104 in the settings table 302 of the datastore 132 to "disabled."

Following the step 716, the process 700 may proceed to a step 718, at which the endpoint application 128 may present an opt-in screen to provide the customer 116 with an option for opting-in to the use of facial recognition technology. Such an opt-in screen may be similar to the opt-out screen 730 described above, except that the toggle switch 732 may be in the opposite position, indicating that biometric facial recognition is not enabled for the monitored location 104. The customer 116 may, if desired, enable the use of biometric facial recognition for the monitored location 104, e.g., by changing the state of the toggle switch 732.

When, at a decision 720, the endpoint application 128 determines that an opt-in input has been received (e.g., by detecting a state change indicating that the customer 116 has changed the position of the toggle switch 732), the process 700 may proceed to a step 722, at which the endpoint application 128 may set the biometric setting 312 for the monitored location 104 to "enabled," e.g., by making an API call to the monitoring service 106 to change the value of the biometric setting 312 for the monitored location 104 in the settings table 302 of the datastore 132 to "enabled."

Figure 8:
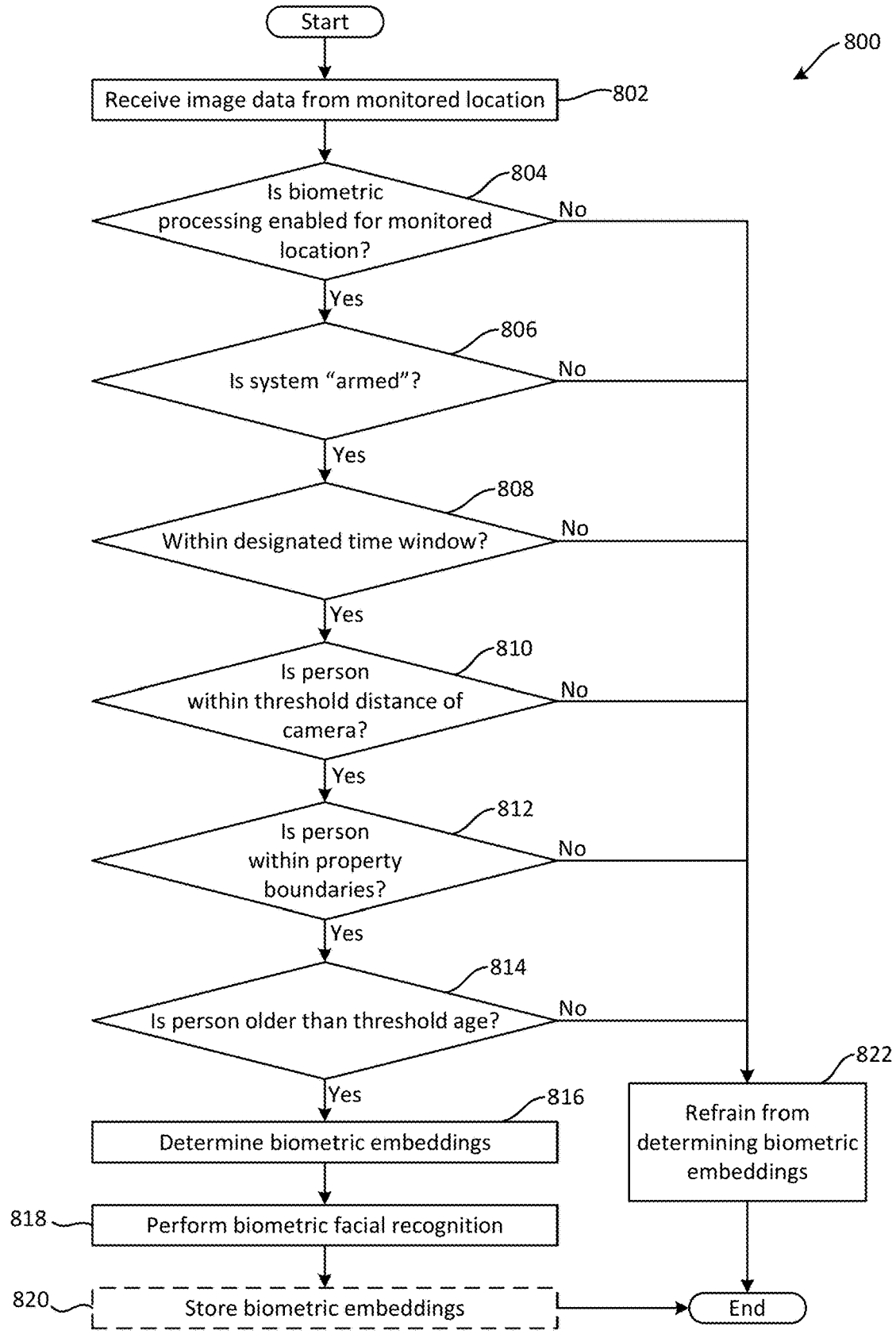
FIG. 8 shows an example process that may be executed to determine whether to generate and/or store biometric embeddings for image data, according to some implementations of the present disclosure.

FIG. 8 shows an example process 800 that may be executed by the edge image processing component 120 and/or the remote image processing component 122 (shown in FIG. 1) to determine whether to generate and/or store biometric embeddings for image data that is acquired by an image sensor 118 of a camera 102 at a monitored location 104.

As shown, the process may begin at a step 802, when the edge image processing component 120 and/or the remote image processing component 122 receives image data from the monitored location 104.

At a decision 804, the edge image processing component 120 and/or the remote image processing component 122 may determine whether biometric processing has been enabled for the monitored location 104. The edge image processing component 120 and/or the remote image processing component 122 may make such a determination, for example, by determining whether the biometric setting 312 for the monitored location 104 (in the settings table 302) is "enabled," e.g., by making an API call to the monitoring service 106 to read the value of the biometric setting 312 for the monitored location 104 from the settings table 302 of the datastore 132.

When, at the decision 804, the edge image processing component 120 and/or the remote image processing component 122 determines that the biometric processing has not been enabled for the monitored location 104, the process 800 may proceed to a step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 804) that the biometric processing has been enabled for the monitored location 104, the process 800 may instead proceed to a decision 806, at which the edge image processing component 120 and/or the remote image processing component 122 may determine whether the security system 100 at the monitored location 104 is in an "armed" state. The edge image processing component 120 and/or the remote image processing component 122 may make such a determination, for example, by determining whether the system status 308 for the monitored location 104 (in the settings table 302) is "armed," e.g., by making an API call to the monitoring service 106 to read the value of the system status 308 for the monitored location 104 from the settings table 302 of the datastore 132.

When, at the decision 806, the edge image processing component 120 and/or the remote image processing component 122 determines that the security system 100 at the monitored location 104 is not in an "armed" state, the process 800 may proceed to the step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 806) that security system 100 at the monitored location 104 is in an "armed" state, the process 800 may instead proceed to a decision 808, at which the edge image processing component 120 and/or the remote image processing component 122 may determine whether the image data was received during a time window or under another circumstance for which the security system 100 has been enabled to perform facial recognition processing. The edge image processing component 120 and/or the remote image processing component 122 may make such a determination, for example, by evaluating the monitoring preferences 306 (in the settings table 302) to determine whether the security system 100 has, in fact, been enabled to preform facial recognition processing at the time in question or in the circumstance in question. For instance, if the monitoring preferences 306 indicate that facial recognition processing is to be performed only between the hours of 8:00 PM and 6:00 AM, and the image data was received outside of those hours, the edge image processing component 120 and/or the remote image processing component 122 may determine that the image data was not received during a time window for which the security system 100 has been enabled to perform facial recognition processing.

When, at the decision 808, the edge image processing component 120 and/or the remote image processing component 122 determines that the image data was not received during a time window or under another circumstance for which the security system 100 has been enabled to perform facial recognition processing, the process 800 may proceed to the step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 808) that the image data was received during a time window or under another circumstance for which the security system 100 has been enabled to perform facial recognition processing, the process 800 may instead proceed to a decision 810, at which the edge image processing component 120 and/or the remote image processing component 122 may determine whether a person (or face) has been detected within a threshold distance (e.g., five meters) of the camera 102. The edge image processing component 120 and/or the remote image processing component 122 may make such a determination, for example, by using one or more trained machine learning (ML) models or other component(s) configured to estimate the distance between a detected person (or a detected face) in an image and the camera 102 that was used to acquire that image. In some implementations, for example, a modified YOLO model (such as that described in "Dist-YOLO: Fast Object Detection with Distance Estimation," M. Vajgl, et al., Appl. Sci. 2022, 12 (3), 1354 (2022)) may be employed for this purpose.

When, at the decision 810, the edge image processing component 120 and/or the remote image processing component 122 determines that a person (or face) has not been detected within a threshold distance of the camera 102, the process 800 may proceed to the step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 810) that a person (or face) has been detected within a threshold distance of the camera 102, the process 800 may instead proceed to a decision 812, at which the edge image processing component 120 and/or the remote image processing component 122 may determine whether a detected person (or a detected face) is within the boundaries of the property in question. The edge image processing component 120 and/or the remote image processing component 122 may make such a determination, for example, by using automated image segmentation (e.g., using a semantic segmentation model or technique) and/or customer input to establish locations of property lines relative to the field of view of the camera 102 and using one more trained machine learning (ML) models or other component(s) to determine whether a detected person (or face) is within those property lines. Examples of models that may be used for object detection and segmentation include Mask R-CNN (which may be accessed, for example, via the URL "github.com").

When, at the decision 812, the edge image processing component 120 and/or the remote image processing component 122 determines that a detected person (or a detected face) is not within the boundaries of the property, the process 800 may proceed to the step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 812) that a detected person (or a detected face) is within the boundaries of the property, the process 800 may instead proceed to a decision 814, at which the edge image processing component 120 and/or the remote image processing component 122 may determine whether detected person is older than a threshold age. Examples of models that may be used for age estimation include MiVOLO and CORAL (which may be accessed, for example, via the URL "github.com"). In some implementations, the threshold age may depend on the geographic location and may be indicated, for example, in the biometric settings 312 or elsewhere. For example, the threshold age of one geographic location may be thirteen and the threshold age for another geographic location may be eighteen. In some implementations, the threshold age may be set to be several years older than the threshold age specified by a law or regulation, to provide some leeway to account for inaccuracies of age estimation models.

When, at the decision 814, the edge image processing component 120 and/or the remote image processing component 122 determines that the detected person is not older than the threshold age, the process 800 may proceed to the step 822, at which the edge image processing component 120 and/or the remote image processing component 122 may refrain from determining biometric embeddings for the image data and the process 800 may thereafter terminate.

When, on the other hand, the edge image processing component 120 and/or the remote image processing component 122 determines (at the decision 814) that the detected person is older than the threshold age, the process 800 may instead proceed to a step 816, at which the edge image processing component 120 and/or the remote image processing component 122 may determine biometric embeddings of the face of the detected person.

At a step 818 of the process 800, the edge image processing component 120 and/or the remote image processing component 122 may perform biometric facial recognition using the embeddings determined at the step 816, e.g., by comparing the determined embeddings against the biometric embeddings 414 of one or more profiles associated with the monitored location 104.

Finally, at the step 820, the edge image processing component 120 and/or the remote image processing component 122 may optionally store the biometric embeddings determined at the step 816, e.g., as biometric embeddings 216 within the event table 202. As noted above, storing the biometric embeddings 216 for an acquired image in such a circumstance may be useful, for example, as ground truth data for subsequent training or retraining one or more image processing modules used for facial recognition (e.g., per the step 818). In some implementations, the biometric embeddings determined at the step 816 may be stored (e.g., within the event table 202) only if a matching biometric embedding 414 are found in a visitor profile. Further, as also noted above, it should be appreciated that, in some implementations, the biometric embeddings determined at the step 816 may be stored (per the step 820), e.g., in the event table 202), before biometric facial recognition is performed using those embeddings (per the step 818). In other implementations, the edge image processing component 120 and/or the remote image processing component 122 may discard the determined biometric embeddings after comparing them against the biometric embeddings 414 from the profile(s) associated with the monitored location (e.g., per the step 818) and may thus refrain from storing them in the event table 202 at all.

Figure 9A:
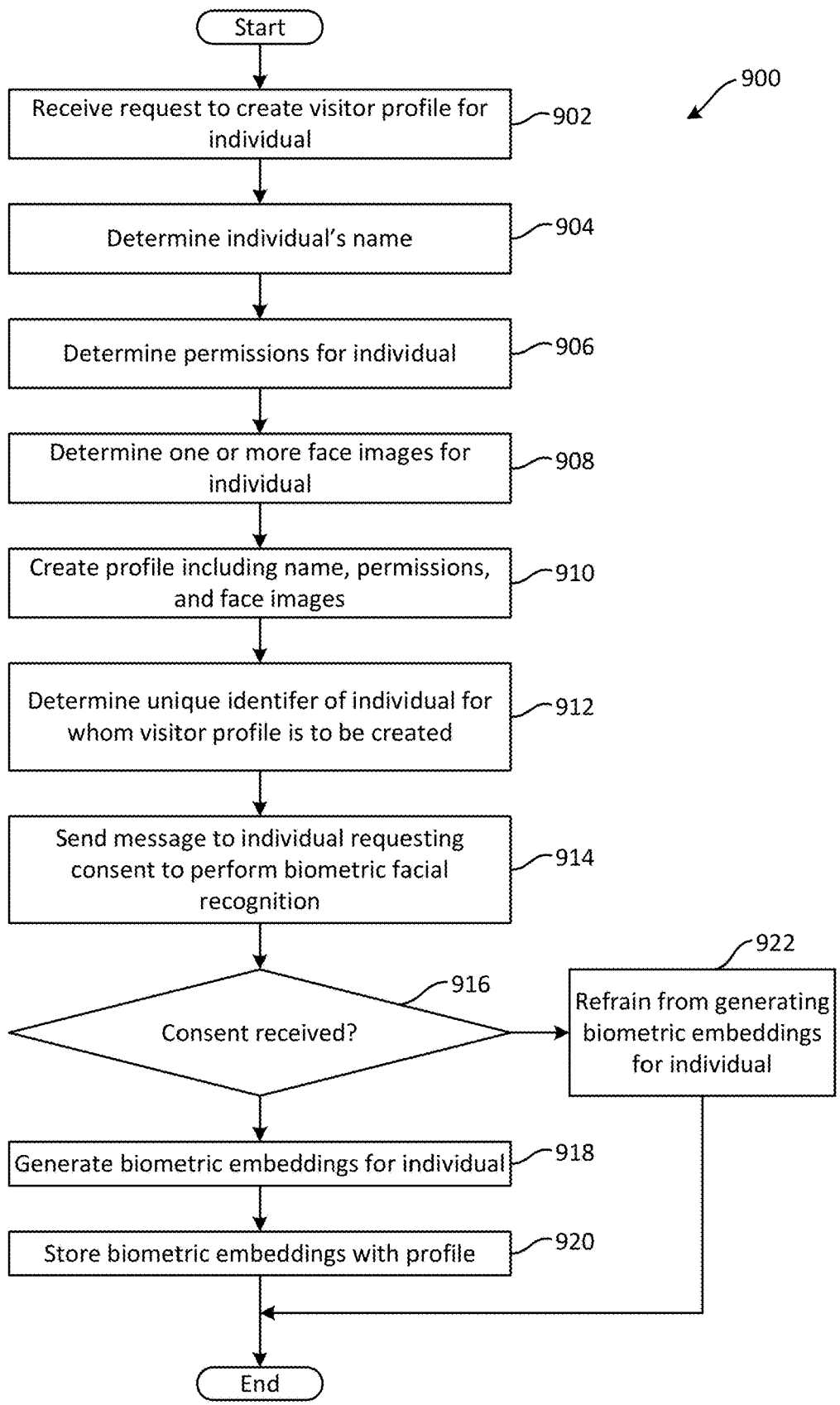
FIG. 9A shows an example process to create a visitor profile for an individual, according to some implementations of the present disclosure.

FIG. 9A shows an example process 900 that may be executed by one or more components of the monitoring service 106 (e.g., the remote image processing component 122 or another component) to create a profile (e.g., a visitor profile) for an individual.

Figure 9B:
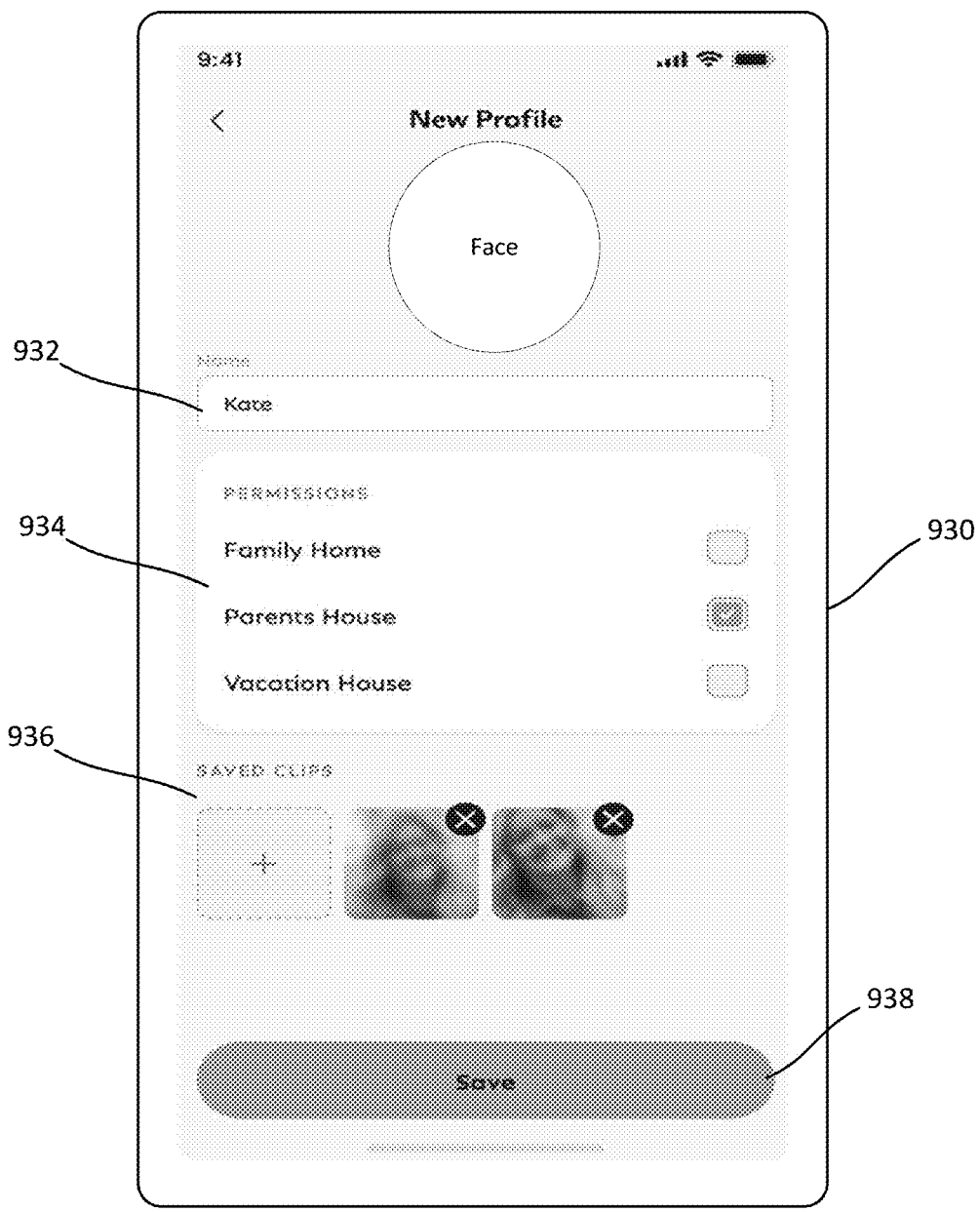
FIG. 9B shows an example screen that may be presented by the endpoint device shown in FIG. 1 to enable entry of information for a new visitor profile, according to some implementations of the present disclosure.

As shown, the process 900 may begin at a step 902, when the monitoring service 106 receives a request (e.g., from an endpoint application 128) to create a visitor profile for a particular individual. In some implementations, the endpoint application 128 may present the customer 116 with a screen 930 (see FIG. 9B) that enables the customer 116 to specify information for a new visitor profile, and the request of the step 902 may correspond to the submission of that information to the monitoring service 106 for processing (e.g., in response to the customer selecting the "save" user interface element 938 on the screen 930).

The screen 930 (or a similar UI mechanism) can be presented in response to any of a number of user inputs. For example, in some implementations, the customer 116 may select a "create new profile" option from a menu of available options. In other implementations, the customer 116 may additionally or alternatively provide a particular input (e.g., press and hold) selecting an image of a face presented via the endpoint application 128, e.g., as an element of an event notification displayed by the endpoint device 114, and the endpoint application 128 may present the screen 930 (or a similar UI mechanism), or an UI element to access such a screen, in response to such input. In still other implementations, the endpoint application 128 may present the screen 930 (or a similar UI mechanism), or an UI element to access such a screen, in response to the customer 116 uploading one or more images of faces from the endpoint device 114 to the datastore(s) 132 and/or the endpoint application 128. Other mechanisms for accessing the screen 930 (or a similar UI mechanism) are also possible.

At a step 904 of the process 900, the monitoring service 106 may determine the name of individual for whom a new profile is to be created. The name may be determined, for example, based on the text input into the "name" field 932 on the screen 930 or otherwise ascertaining the name of the individual.

At a step 906 of the process 900, the monitoring service 106 may determine one or more permissions for the individual, such as whether the individual is authorized to visit one or more monitored locations or is perhaps not authorized to visit such properties. Such permissions may be determined, for example, based on selections made within a "permissions" region 934 of the screen 930.

At a step 908 of the process 900, the monitoring service 106 may determine one or more face images for the individual. Such face images may be determined, for example, based on images selected by the customer 116 using a "saved clips" region 936 of the screen 930. In some implementations, the endpoint application 128 may enable a customer 116 to select images only from one or more particular sources, e.g., from a camera roll of the endpoint device 114, to minimize the risk of the customer 116 inadvertently creating a profile for an individual without obtaining that individual's consent, e.g., because it is likely that the customer 116 actually knows and is able to obtain consent from the individuals who appear in the photos from such a source.

At a step 910 of the process 900, the monitoring service 106 may create a profile including the name determined at the step 904, the permissions determined at the step 906, and the images determined at the step 908. Data for the profile that is so created may be stored, for example, in a new row of the table 402 shown in FIG. 4. In particular, in the table 402, the indicated name may be stored as a name 906, the indicated permissions may be stored as authorized location IDs 408 and/or unauthorized location IDs 410, and the indicated images of the individual's face may be stores as image(s) 412.

At a step 912 of the process 900, the monitoring service 106 may, in some implementations, determine a unique identifier (e.g., an email address, a phone number, a user identifier, etc.) of the individual for whom the profile is being created. Although not shown in FIG. 9B, it should be appreciated that, in some implementations, the endpoint application 128 may additionally provide an input field or other mechanism on the screen 930 that enables the customer 116 to input or select (e.g., from a contact list or address book of the endpoint device 114) contact information of the individual in question, or may automatically retrieve such contact information from a contact list or address book of the endpoint device 114 or otherwise obtain such contact information.

At a step 914 of the process 900, the monitoring service 106 may communicate (e.g., send an email, a text message, a push notification, etc.) to the individual for whom the profile is being created, to request the individual's consent to perform biometric facial recognition using images of the individual's face. Such a communication may indicate, for example (1) that the customer 116 initiated the request for consent, (2) the scope of the requested consent, (3) a mechanism or process to revoke the consent, if desired, and (4) how to provide consent, e.g., by typing a name, clicking one or more buttons, etc.

At a decision 916 of the process, the monitoring service 106 may determine whether the individual has provided the requested consent, e.g., by receiving an indication that the customer 116 has selected a user interface element in the communication (e.g., the email message, text message, push notification, etc.) or in a web page or application screen (e.g., a screen of an endpoint application 128) accessed via a link in such communication.

When, at the decision 916, the monitoring service 106 determines that the requisite consent has been received from the individual (e.g., by receiving an indication that the customer 116 has typed their name or otherwise taken one or more steps to indicate consent), the process may proceed to a step 918, at which the monitoring service 106 may generate biometric embeddings for one or more of the face images determined at the step 908.

At a step 920 of the process 900, the monitoring service 106 may store the biometric embeddings determined at the step 918, e.g., by writing them as biometric embeddings 414 for the individual within the profile table 402.

When, at the decision 916, the monitoring service 106 determines that the requisite consent has not been received from the individual, the process may instead proceed to a step 922, at which the monitoring service 106 may refrain from generating biometric embeddings for the face images determined at the step 908. In some such implementations, as noted previously, the monitoring application 126 may nonetheless have access to the face images stored at the step 908, as well as the other information added to the visitor profile, to enable a monitoring agent 112 to visually review the face images and other information from the profile when reviewing recorded or live video for an event at a monitored location 104 to determine whether or not particular individuals are authorized visitors.

In some implementations, the endpoint application 128 may facilitate the deletion of some or all of the biometric embeddings that have been stored in the datastore(s) 132, e.g., as biometric embeddings 216 in the event table 202 and/or biometric embeddings 414 in the profile table 402. For example, in response to the customer 116 moving the toggle switch 732 shown in FIG. 7B to the "off" position, the endpoint application 128 may present a prompt asking the customer 116 to indicate whether certain previously acquired biometric data should be deleted from the security system 100. In some implementations, such a prompt may explain that images of faces of individuals will be maintained in storage, e.g., as image data 212 in the event table 202 and/or one or more images 412 in the profile table 402, even if deletion of biometric data is requested. Once again, maintaining images of faces in this manner may, for example, enable a monitoring agent 112 to visually review the face images and other information from a profile when reviewing recorded or live video for an event at a monitored location 104 to determine whether or not particular individuals are authorized visitors.

Figure 10:
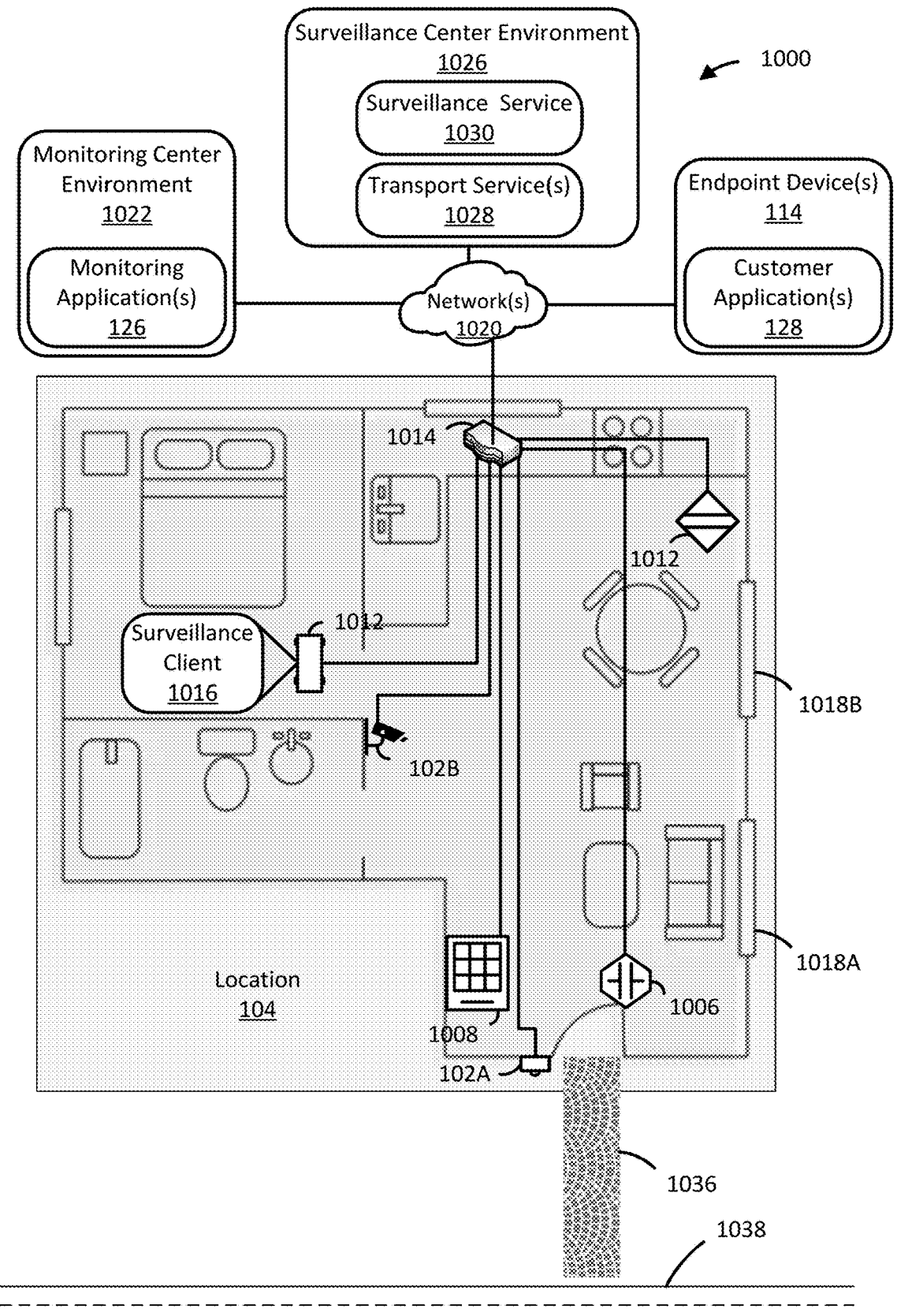
FIG. 10 shows an example implementation of a security system that includes several of the components shown FIG. 1, according to some implementations of the present disclosure.

FIG. 10 is a schematic diagram of an example security system 1000 with which various aspects of the present disclosure may be employed. As shown, in some implementations, the security system 1000 may include a plurality of monitored locations 104 (only one of which is illustrated in FIG. 10), a monitoring center environment 1022, a surveillance center environment 1026, one or more endpoint devices 114, and one or more communication networks 1020. The monitored location 104, the monitoring center environment 1022, the surveillance center environment 1026, the one or more endpoint device(s) 114, and the communication network(s) 1020 may each include one or more computing devices (e.g., as described below with reference to FIG. 11). The endpoint device(s) 114 may include one or more endpoint applications 128, e.g., as applications hosted on or otherwise accessible by the endpoint device(s) 114. In some implementations, the endpoint applications 128 may be embodied as web applications that can be accessed via browsers of the endpoint device(s) 114. The monitoring center environment 1022 may include one or more monitoring applications 126, e.g., as applications hosted on or otherwise accessible to computing devices within the monitoring center environment 1022. In some implementations, the monitoring applications 126 may be embodied as web applications that can be accessed via browsers of computing devices operated by monitoring agents 112 within the monitoring center environment 1022.

The surveillance center environment 1026 may include a surveillance service 1030 and one or more transport services 1028.

As shown in FIG. 10, the monitored location 104 may include one or more image capture devices (e.g., cameras 102A and 102B), one or more contact sensor assemblies (e.g., contact sensor assembly 1006), one or more keypads (e.g., keypad 1008), one or more motion sensor assemblies (e.g., motion sensor assembly 1010), a base station 1012, and a router 1014. As illustrated, the base station 1012 may host a surveillance client 1016.

In some implementations, the router 1014 may be a wireless router that is configured to communicate with the devices disposed at the monitored location 104 (e.g., devices 102A, 102B, 1006, 1008, 1010, and 1012) via communications that comport with a communications standard such as any of the various Institute of Electrical and Electronics Engineers (IEEE) 108.11 standards. As illustrated in FIG. 10, the router 1014 may also be configured to communicate with the network(s) 1020. In some implementations, the router 1014 may implement a local area network (LAN) within and proximate to the monitored location 104. In other implementations, other types of networking technologies may additionally or alternatively be used within the monitored location 104. For instance, in some implementations, the base station 1012 may receive and forward communication packets transmitted by one or both of the cameras 102A, 102B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 1020 may include one or more public and/or private networks that support, for example, internet protocol (IP) communications. The network(s) 1020 may include, for example, one or more LANs, one or more PANs, and/or one or more wide area networks (WANs). LANs that may be employed include wired or wireless networks that support various LAN standards, such as a version of IEEE 108.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CMDA), Global System for Mobiles (GSM), or the like. Regardless of the particular networking technology that is employed, the network(s) 1020 may connect and enable data communication among the components within the monitored location 104, the monitoring center environment 1022, the surveillance center environment 1026, and the endpoint device(s) 114. In at least some implementations, both the monitoring center environment 1022 and the surveillance center environment 1026 may include networking components (e.g., similar to the router 1014) that are configured to communicate with the network(s) 1020 and various computing devices within those environments.

The surveillance center environment 1026 may include physical space, communications, cooling, and power infrastructure to support networked operation of a large number of computing devices. For instance, the infrastructure of the surveillance center environment 1026 may include rack space into which the computing devices may be installed, uninterruptible power supplies, cooling plenum and equipment, and networking devices. The surveillance center environment 1026 may be dedicated to the security system 1000, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 10, the surveillance center environment 1026 may be configured to host the surveillance service 1030 and the transport service(s) 1028.

The monitoring center environment 1022 may include a plurality of computing devices (e.g., desktop computers) and network equipment (e.g., one or more routers) that enable communication between the computing devices and the network(s) 1020. The endpoint device(s) 114 may each include a personal computing device (e.g., a desktop computer, laptop, tablet, smartphone, or the like) and network equipment (e.g., a router, cellular modem, cellular radio, or the like). As illustrated in FIG. 10, the monitoring center environment 1022 may be configured to host the monitoring application(s) 126 and the endpoint device(s) 114 may be configured to host the endpoint application(s) 128.

The devices 102A, 102B, 1006, and 1010 may be configured to acquire analog signals via sensors incorporated into the devices, generate digital sensor data based on the acquired signals, and communicate (e.g., via a wireless link with the router 1014) the sensor data to the base station 1012 and/or one or more components within the surveillance center environment 1026 (e.g., the remote image processing component 122 described above) . . . . The types of sensor data generated and communicated by these devices may vary depending on the characteristics of the sensors they include. For instance, the image capture devices or cameras 102A and 102B may acquire ambient light, generate one or more frames of image data based on the acquired light, and communicate the frame(s) to the base station 1012 and/or one or more components within the surveillance center environment 1026, although the pixel resolution and frame rate may vary depending on the capabilities of the devices. In some implementations, the cameras 102A and 102B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 1012 and/or one or more components within the surveillance center environment 1026. In the example shown in FIG. 10, the camera 102A has a field of view (FOV) that originates proximal to a front door of the monitored location 104 and can acquire images of a walkway 1036, a road 1038, and a space between the monitored location 104 and the road 64A0. The camera 102B, on the other hand, has an FOV that originates proximal to a bathroom of the monitored location 104 and can acquire images of a living room and dining area of the monitored location 104. The camera 102B may further acquire images of outdoor areas beyond the monitored location 104, e.g., through windows 1118A and 1118B on the right-hand side of the monitored location 104.

Individual sensor assemblies deployed at the monitored location 104, e.g., the contact sensor assembly 1006 shown in FIG. 10, may include, for example, a sensor that can detect the presence of a magnetic field generated by a magnet when the magnet is proximal to the sensor. When the magnetic field is present, the contact sensor assembly 1006 may generate Boolean sensor data specifying a closed state of a window, door, etc. When the magnetic field is absent, the contact sensor assembly 1006 may instead generate Boolean sensor data specifying an open state of the window, door, etc. In either case, the contact sensor assembly 1006 shown in FIG. 10 may communicate sensor data indicating whether the front door of the monitored location 104 is open or closed to the base station 1012.

Individual motion sensor assemblies that are deployed at the monitored location 104, e.g., the motion sensor assembly 1010 shown in FIG. 10, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 1010 may generate Boolean sensor data specifying an alert state. When the sensor does not detect a change in the reflected pressure waves, e.g., because no objects are moving within the monitored space, the motion sensor assembly 1010 may instead generate Boolean sensor data specifying a still state. In either case, the motion sensor assembly 1010 may communicate the sensor data to the base station 1012. It should be noted that the specific sensing modalities described above are not limiting to the present disclosure. For instance, as but one example of an alternative implementation, the motion sensor assembly 1010 may instead (or additionally) base its operation on the detection of changes in reflected electromagnetic waves.

While particular types of sensors are described above, it should be appreciated that other types of sensors may additionally or alternatively be employed within the monitored location 104 to detect the presence and/or movement of humans, or other conditions of interest, such as smoke, elevated carbon dioxide levels, water accumulation, etc., and to communicate data indicative of such conditions to the base station 1012. For instance, although not illustrated in FIG. 10, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 1012 may additionally or alternatively be configured to identify particular signal profiles indicative of particular conditions, such as sound profiles indicative of breaking glass, footsteps, coughing, etc.

The keypad 1008 shown in FIG. 10 may be configured to interact with a user and interoperate with the other devices disposed in the monitored location 104 in response to such interactions. For instance, in some examples, the keypad 1008 may be configured to receive input from a user that specifies one or more commands and to communicate the specified commands to one or more addressed devices and/or processes, e.g., one or more of the devices disposed in the monitored location 104, the monitoring application(s) 126, and/or the surveillance service 1030. The communicated commands may include, for example, codes that authenticate the user as a resident of the monitored location 104 and/or codes that request activation or deactivation of one or more of the devices disposed in the monitored location 104. In some implementations, the keypad 1008 may include a user interface (e.g., a tactile interface, such as a set of physical buttons or a set of "soft" buttons on a touchscreen) configured to interact with a user (e.g., receive input from and/or render output to the user). Further, in some implementations, the keypad 1008 may receive responses to the communicated commands and render such responses via the user interface as visual or audio output.

The base station 1012 shown in FIG. 10 may be configured to interoperate with other security system devices disposed at the monitored location 104 to provide local command and control and/or store-and-forward functionality via execution of the surveillance client 1016. To implement local command and control functionality, the base station 1012 may execute a variety of programmatic operations through execution of the surveillance client 1016 in response to various events. Examples of such events include reception of commands from the keypad 1008, reception of commands from one of the monitoring application(s) 126 or the endpoint application 128 via the network(s) 1020, and detection of the occurrence of a scheduled event. The programmatic operations executed by the base station 1012 via execution of the surveillance client 1016 in response to events may include, for example, activation or deactivation of one or more of the devices 102A, 102B, 1006, 1008, and 1010; sounding of an alarm; reporting an event to the surveillance service 1030; and/or communicating "location data" to one or more of the transport service(s) 1028. Such location data may include, for example, data specifying sensor readings (sensor data), image data acquired by one or more cameras 102, configuration data of one or more of the devices disposed at the monitored location 104, commands input and received from a user (e.g., via the keypad 1008 or a endpoint application 128), or data derived from one or more of the foregoing data types (e.g., filtered sensor data, filtered image data, summarizations of sensor data, event data specifying an event detected at the monitored location 104 via the sensor data, etc.).

In some implementations, to implement store-and-forward functionality, the base station 1012, through execution of the surveillance client 1016, may receive sensor data, package the data for transport, and store the packaged sensor data in local memory for subsequent communication. Such communication of the packaged sensor data may include, for example, transmission of the packaged sensor data as a payload of a message to one or more of the transport service(s) 1028 when a communication link to the transport service(s) 1028 via the network(s) 1020 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 1028 of the surveillance center environment 1026 may be configured to receive messages from monitored locations (e.g., the monitored location 104), parse the messages to extract payloads included therein, and store the payloads and/or data derived from the payloads within one or more data stores hosted in the surveillance center environment 1026. Examples of such data stores are described below in connection with FIG. 11. In some implementations, the transport service(s) 1028 may expose and implement one or more application programming interfaces (APIs) that are configured to receive, process, and respond to calls from base stations (e.g., the base station 1012) via the network(s) 1020. Individual instances of transport service(s) 1028 may be associated with and specific to certain manufactures and/or models of location-based monitoring equipment (e.g., SIMPLISAFE equipment, RING equipment, etc.).

The API(s) of the transport service(s) 1028 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 1028. In some implementations, portions of the HTTP communications may be encrypted to increase security. Alternatively (or additionally), in some implementations, one or more APIs of the transport service(s) 1028 may be implemented as a .NET web API that responds to HTTP posts to particular URLs. Alternatively (or additionally), in some implementations, one or more APIs of the transport service(s) 1028 may be implemented using simple file transfer protocol commands. Thus, the API(s) of the transport service(s) 1028 are not limited to any particular implementation.

The surveillance service 1030 within the surveillance center environment 1026 may be configured to control the overall logical setup and operation of the security system 1000. As such, the surveillance service 1030 may communicate and interoperate with the transport service(s) 1028, the monitoring application(s) 126, the endpoint application(s) 128, and the various devices disposed at the monitored location 104 via the network(s) 1020. In some implementations, the surveillance service 1030 may be configured to monitor data from a variety of sources for events (e.g., a break-in event) and, when an event is detected, notify one or more of the monitoring applications 126 and/or the endpoint application(s) 128 of the event.

In some implementations, the surveillance service 1030 may additionally be configured to maintain state information regarding the monitored location 104. Such state information may indicate, for example, whether the monitored location 104 is safe or under threat. In some implementations, the surveillance service 1030 may be configured to change the state information to indicate that the monitored location 104 is safe only upon receipt of a communication indicating a clear event (e.g., rather than making such a change solely due to the lack of additional events being detected). This feature can prevent a "crash and smash" robbery (e.g., where an intruder promptly destroys or disables monitoring equipment) from being successfully executed. In addition, in some implementations, the surveillance service 1030 may be configured to monitor one or more particular zones within the monitored location 104, such as one or more particular rooms or other distinct regions within and/or around the monitored location 104 and/or one or more defined regions within the FOVs of the respective image capture devices deployed in the monitored location (e.g., the cameras 102A and 102B shown in FIG. 10).

The individual monitoring application(s) 126 of the monitoring center environment 1022 may be configured to enable monitoring personnel to interact with respective computing devices to provide monitoring services for respective locations (e.g., the monitored location 104), and to execute a variety of programmatic operations in response to such interactions. For example, in some implementations, a monitoring application 126 may control its host computing device to provide information regarding events detected at monitored locations, such as the monitored location 104, to a person operating that computing device. Such events may include, for example, detected movement within a particular zone of the monitored location 104. As described above in connection with FIGS. 5 and 6, in some implementations, the monitoring application 126 may cause a monitoring device 110 to present video of events within individual windows 506 of a screen 502, and may further establish a streaming connection with one or more cameras 102 at the monitored location and cause the monitoring device 110 to provide streamed video from such camera(s) 102 within the windows 604 and/or a main viewer window 606 of a screen 602, as well as to allow audio communication between the monitoring device 110 and the camera(s) 102.

The endpoint application(s) 128 of the endpoint device(s) 114 may be configured to enable customers to interact with their computing devices (e.g., their smartphones or personal computers) to access various services provided by the security system 1000 for their individual homes or other locations (e.g., the monitored location 104), and to execute a variety of programmatic operations in response to such interactions. For example, in some implementations, an endpoint application 128 may control a endpoint device 114 (e.g., a smartphone or personal computer) to provide information regarding events detected at monitored locations, such as the monitored location 104, to the customer 116 operating that endpoint device 114. Such events may include, for example, detected movement within a particular zone of the monitored location 104. In some implementations, the endpoint application 128 may additionally or alternatively be configured to process input received from the customer 116 to activate or deactivate one or more of the devices disposed within the monitored location 104. Further, as described above in connection with FIG. 6, the endpoint application 128 may additionally or alternatively be configured to establish a streaming connection with one or more cameras 102 at the monitored location and cause the endpoint device 114 to display streamed video from such camera(s) 102, as well as to allow audio communication between the endpoint device 114 and the camera(s) 102.

Turning now to FIG. 11, a computing device 1100 is illustrated schematically. As shown in FIG. 11, the computing device 1100 may include at least one processor 1102, volatile memory 1104, one or more interfaces 1106, non-volatile memory 1108, and an interconnection mechanism 1114. The non-volatile memory 1108 may include executable code 1110 and, as illustrated, may additionally include at least one data store 1112.

In some implementations, the non-volatile (non-transitory) memory 1108 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 1110 stored in the non-volatile memory may include an operating system and one or more applications or programs that are configured to execute under control of the operating system. In some implementations, the code 1110 may additionally or alternatively include specialized firmware and embedded software that is executable without dependence upon a commercially available operating system. Regardless of its configuration, execution of the code 1110 may result in manipulated data that may be stored in the data store 1112 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 1102 of the computing device 1100 may be embodied by one or more processors that are configured to execute one or more executable instructions, such as a computer program specified by the code 1110, to control the operations of the computing device 1100. The function, operation, or sequence of operations can be hard coded into the circuitry or soft coded by way of instructions held in a memory device (e.g., the volatile memory 1104) and executed by the circuitry. In some implementations, the processor 1102 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 1110, the processor 1102 may copy the code 1110 from the non-volatile memory 1108 to the volatile memory 1104. In some implementations, the volatile memory 1104 may include one or more static or dynamic random access memory (RAM) chips and/or cache memory (e.g. memory disposed on a silicon die of the processor 1102). Volatile memory 1104 may offer a faster response time than a main memory, such as the non-volatile memory 1108.

Through execution of the code 1110, the processor 1102 may control operation of the interfaces 1106. The interfaces 1106 may include network interfaces. Such network interfaces may include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. Such communication protocols may include, for example, TCP and UDP among others. As such, the network interfaces may enable the computing device 1100 to access and communicate with other computing devices via a computer network.

The interface(s) 1106 may include one or more user interfaces. For instance, in some implementations, the user interface(s) 1106 may include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interface(s) 1106 may enable the computing device 1100 to interact with users to receive input and/or render output. The rendered output may include, for example, one or more GUIs including one or more controls configured to display outputs and/or receive inputs. The received inputs may specify values to be stored in the data store 1112. The displayed outputs may indicate values stored in the data store 1112.

The various features of the computing device 1100 described above may communicate with one another via the interconnection mechanism 1114. In some implementations, the interconnection mechanism 1114 may include a communications bus.

Turning now to FIG. 12, an example base station 1012 is schematically illustrated. As shown in FIG. 12, the base station 1012 may include at least one processor 1202, volatile memory 1204, non-volatile memory 1208, at least one network interface 1206, a user interface 1214, a battery assembly 1216, and an interconnection mechanism 1218. The non-volatile memory 1208 may store executable code 1210 and, as illustrated, may also include a data store 1212. In some implementations, the features of the base station 1012 enumerated above may be incorporated within, or may otherwise be supported by, a housing 1220. In some implementations, the user interface 1214 of the base station 1012 may include only one or more speakers to provide audio output to a user concerning operational state changes of the security system 1000, detected threats, etc., and/or one or more visual indicators (e.g., light emitting diode (LED) indicators) to indicate when the base station 1012 is operational, responding to a user input (e.g., via the keypad 1008), etc. In other implementations, the user interface may additionally or alternatively include a more complex output component (e.g., a display screen) and/or may include one or more user input components, such as one or more microphones (e.g., to receive voice commands) and/or a keypad (e.g., to receive tactile input).

In some implementations, the non-volatile (non-transitory) memory 1208 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In some implementations, the code 1210 stored in the non-volatile memory may include an operating system and one or more applications or programs that are configured to execute under the control of the operating system. In some implementations, the code 1210 may additionally or alternatively include specialized firmware and embedded software that is executable without dependence upon a commercially available operating system. In any event, regardless how the code 1210 is embodied, execution of the code 1210 may implement the surveillance client 1016 shown in FIG. 10 and enable the storage and manipulation of data for the surveillance client 1016 within the data store 1212.

The processor 1202 of the base station 1012 may include one or more processors configured to execute instructions encoded within a computer-readable medium, such as a computer program embodied by the code 1210, to control the operations of the base station 1012. As used herein, the term "processor" describes circuitry that executes a function, an operation, or a sequence of operations. The function, operation, or sequence of operations may be hard coded into the circuitry or soft coded by way of instructions held in a memory device (e.g., the volatile memory 1204) and executed by the circuitry. In some implementations, the processor 1202 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), and/or multicore processors.

Prior to executing the code 1210, the processor 1202 may copy at least a portion of the code 1210 from the non-volatile memory 1208 to the volatile memory 1204. In some implementations, the volatile memory 1204 may include one or more static or dynamic random access memory (RAM) chips and/or cache memory (e.g., memory disposed on a silicon die of the processor 1202). Volatile memory 1204 may offer a faster response time than a main memory, such as the non-volatile memory 1208.

Through execution of the code 1210, the processor 1202 may control operation of the network interface 1206. For instance, in some implementations, the network interface 1206 may include one or more physical interfaces (e.g., a radio, an ethernet port, a universal serial bus (USB) port, etc.) as well as a software stack including drivers and/or other code 1210 that is configured to communicate with the one or more physical interfaces to support one or more LAN, PAN, and/or WAN standard communication protocols. Such communication protocols may include, for example, transmission control protocol (TCP) and user datagram protocol (UDP) among others. As such, the network interface 1206 may enable the base station 1012 to access and communicate with other computing devices (e.g., the other devices disposed in the monitored location 104 of FIG. 10) via a computer network (e.g., the LAN established by the router 1014 of FIG. 10, the network(s) 1020 of FIG. 10, and/or a point-to-point connection). For instance, in some implementations, the network interface 1206 may utilize sub-GHz wireless networking to transmit wake messages to the other computing devices to request streams of sensor data.

Through execution of the code 1210, the processor 1202 may additionally control operation of hardware and a software stack including drivers and/or other code 1210 that is configured to communicate with other system devices. As such, the base station 1012 may interact with other system components in response to received inputs. Such inputs may specify, for example, values that are to be stored in the data store 1212. The base station 1012 may further provide outputs representing values stored in the data store 1212. In some implementations, the base station 1012 may additionally include one or more light-emitting diodes (LEDs) or other visual indicators to visually communication information, such as system status or alarm events. Further, in some implementations, the base station 1012 may additionally or alternatively include a siren (e.g., a 95 decibel (dB) siren) or other audio output device that may be controlled by the processor 1202 to output an audio indication that a break-in event has been detected.

The various components of the base station 1012 described above may communicate with one another via the interconnection mechanism 1218. In some implementations, the interconnection mechanism 1218 may include a communications bus. Further, in some implementations, the battery assembly 1216 may be configured to supply operational power to the various features of the base station 1012 described above. In some implementations, the battery assembly 1216 may include at least one rechargeable battery (e.g., one or more nickel metal hydride (NiMH) or lithium batteries). In some implementations, such a rechargeable battery (or batteries) may have a runtime capacity sufficient to operate the base station 1012 for twenty-four hours or longer while the base station 1012 is disconnected from or otherwise not receiving line power. In some implementations, the battery assembly 1216 may additionally or alternatively include power supply circuitry to receive, condition, and distribute line power to operate the base station 1012 and/or to recharge one or more rechargeable batteries. Such power supply circuitry may include, for example, a transformer and a rectifier, among other circuitry, to convert AC line power to DC device and/or recharging power.

Turning now to FIG. 13, an example keypad 1008 is schematically illustrated. As shown in FIG. 13, the keypad 1008 may include at least one processor 1302, volatile memory 1304, non-volatile memory 1308, at least one network interface 1306, a user interface 1314, a battery assembly 1316, and an interconnection mechanism 1318. The non-volatile memory 1308 may store executable code 1310 and, as illustrated, may also include a data store 1312. In some implementations, the features of the keypad 1008 enumerated above may be incorporated within, or may otherwise be supported by, a housing 1320.

In some implementations, the respective descriptions of the processor 1202, the volatile memory 1204, the non-volatile memory 1208, the interconnection mechanism 1218, and the battery assembly 1216 with reference to the base station 1012 are applicable to the processor 1302, the volatile memory 1304, the non-volatile memory 1308, the interconnection mechanism 1318, and the battery assembly 1316 with reference to the keypad 1008. As such, those descriptions will not be repeated here.

Through execution of the code 1310, the processor 1302 of the keypad 1008 may control operation of the network interface 1306. In some implementations, the network interface 1306 may include one or more physical interfaces (e.g., a radio, an ethernet port, a USB port, etc.) and a software stack including drivers and/or other code 1310 that is configured to communicate with the one or more physical interfaces to support one or more LAN, PAN, and/or WAN standard communication protocols. Such communication protocols may include, for example, TCP and UDP, among others. As such, the network interface 1306 may enable the keypad 1008 to access and communicate with other computing devices (e.g., the other devices disposed in the monitored location 104 of FIG. 10) via a computer network (e.g., the LAN established by the router 1014).

Through execution of the code 1310, the processor 1302 may additionally control operation of the user interface 1314. In some implementations, the user interface 1314 may include user input and/or output devices (e.g., physical keys arranged as a keypad, a touchscreen, a display, a speaker, a camera, a biometric scanner, an environmental sensor, etc.) and a software stack including drivers and/or other code 1310 that is configured to communicate with the user input and/or output devices. As such, the user interface 1314 may enable the keypad 1008 to interact with users to receive inputs and/or render outputs. Examples of outputs that may be rendered by the user interface 1314 include one or more GUIs comprising one or more controls configured to display outputs and/or receive inputs. The inputs received by the user interface 1314 may specify, for example, values that are to be stored in the data store 1312. The outputs provided by the user interface 1314 may further indicate values stored in the data store 1312. In some implementations, parts of the user interface 1314 (e.g., one or more LEDs) may be accessible and/or visible as part of, or through, the housing 1320.

Figure 14:
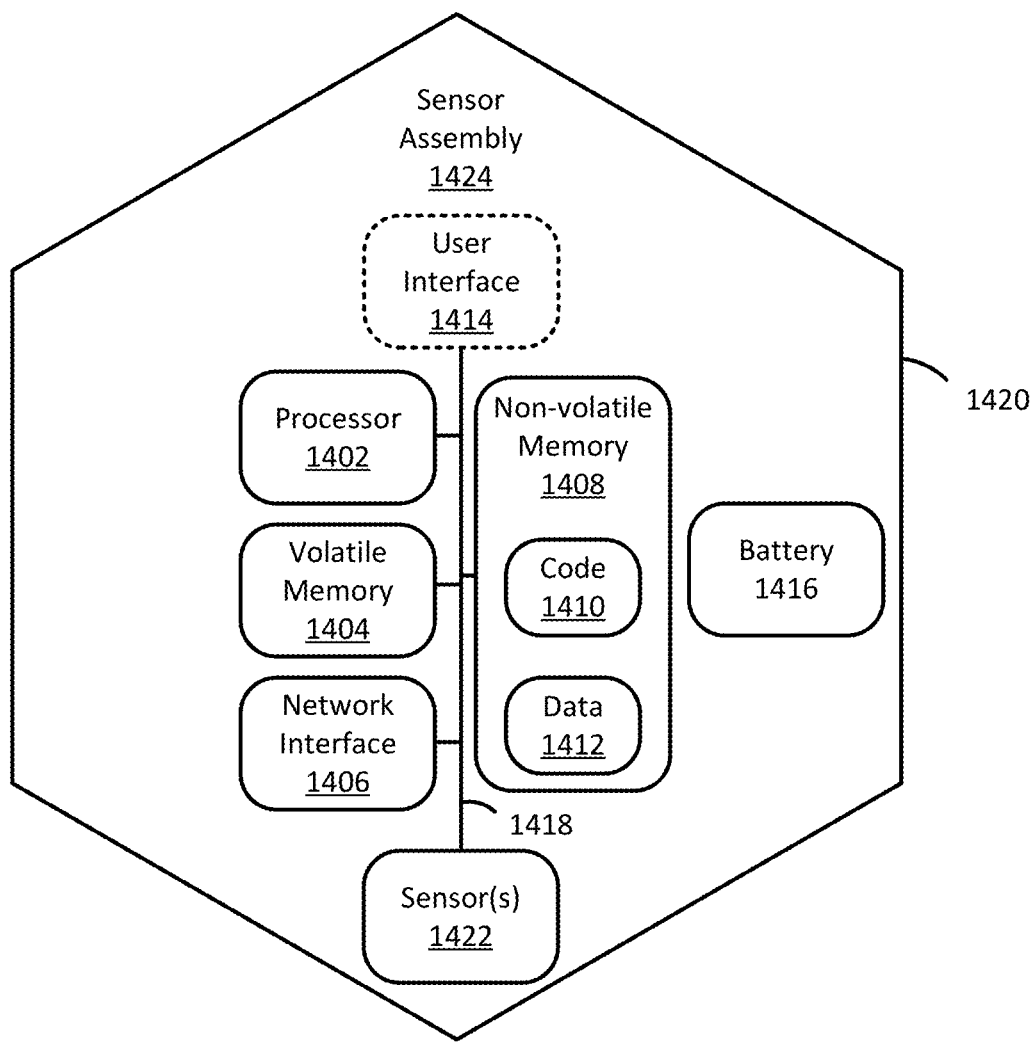
FIG. 14 shows an example implementation of a security sensor of the security system shown in FIG. 10, according to some implementations of the present disclosure.

Turning now to FIG. 14, an example sensor assembly 1424 is schematically illustrated. Several example implementations of the sensor assembly 1424 (e.g., the cameras 102 and 102B, the motion sensor assembly 1010, and the contact sensor assemblies 1006) are illustrated in FIG. 10 and described above. As shown in FIG. 14, the sensor assembly 1424 may include at least one processor 1402, volatile memory 1404, non-volatile memory 1408, at least one network interface 1406, a battery assembly 1416, an interconnection mechanism 1418, and at least one sensor 1422. The non-volatile memory 1408 may store executable code 1410 and, as illustrated, may also include a data store 1412. In some implementations, the features of the sensor assembly 1424 enumerated above may be incorporated within, or included as a part of, a housing 1420. Further, in some implementations, the sensor assembly 1424 may additionally include a user interface 1414.

In some implementations, the respective descriptions of the processor 1202, the volatile memory 1204, the non-volatile memory 1208, the interconnection mechanism 1218, and the battery assembly 1216 with reference to the base station 1012 are applicable to the processor 1402, the volatile memory 1404, the non-volatile memory 1408, the interconnection mechanism 1418, and the battery assembly 1416 with reference to the sensor assembly 1424. As such, those descriptions will not be repeated here.

Through execution of the code 1410, the processor 1402 may control operation of the network interface 1406 and the user interface 1414 (if present). In some implementations, the network interface 1406 may include one or more physical interfaces (e.g., a radio, an ethernet port, a USB port, etc.) and a software stack including drivers and/or other code 1410 that is configured to communicate with the one or more physical interfaces to support one or more LAN, PAN, and/or WAN standard communication protocols. Such communication protocols may include, for example, TCP and UDP, among others. As such, the network interface 1406 may enable the sensor assembly 1424 to access and communicate with other computing devices (e.g., the other devices disposed in the monitored location 104 of FIG. 10) via a computer network (e.g., the LAN established by the router 1014). For instance, in some implementations, when executing the code 1410, the processor 1402 may control the network interface to stream (e.g., via UDP) sensor data acquired from the sensor assembly 1422 to the base station 1012. Further, in some implementations, through execution of the code 1410, the processor 1402 may additionally or alternatively control the network interface 1406 to enter a power conservation mode, e.g., by powering down a 2.4 GHz radio and powering up a sub-GHz radio that are both included in the network interface 1406. In such implementations, through execution of the code 1410, the processor 1402 may additionally control the network interface 1406 to enter a streaming mode, e.g., by powering up a 2.4 GHz radio and powering down a sub-GHz radio, for example, in response to receiving a wake signal from the base station via the sub-GHz radio.

Through execution of the code 1410, the processor 1402 may additionally or alternatively control other operations of the sensor assembly 1424. In some implementations, for example, a user interface 1414 of the sensor assembly 1424 may include user input and/or output devices (e.g., physical buttons, a touchscreen, a display, a speaker, a camera, an accelerometer, a biometric scanner, an environmental sensor, one or more LEDs, etc.) and a software stack including drivers and/or other code 1410 that is configured to communicate with the user input and/or output devices. As such, the sensor assembly 1424 may enable the user interface 1414 to interact with users to receive inputs and/or render outputs. The outputs rendered by the user interface 1314 may include, for example, one or more GUIs including one or more controls configured to display output and/or receive input. The inputs received by the user interface 1414 may, for example, specify values that are to be stored in the data store 1412. The outputs provided by the user interface 94 may further indicate values stored in the data store 1412. In some implementations, parts of sensor assembly 1424 may be accessible and/or visible as part of, or through, the housing 1420.

As shown in FIG. 14, the sensor assembly 1424 may include one or more types of sensors 1422, such as one or more of the sensors described above with reference to the cameras 102A and 102B, the motion sensor assembly 1010, and the contact sensor assembly 1006 of FIG. 10, or other types of sensors. In some implementations, for example, the sensor(s) 1422 may include a camera and a temperature sensor. Regardless of the type(s) of sensor(s) XD22 that employed, the processor 1402 may (e.g., via execution of the code 1410) acquire sensor data from the sensor(s) 1422 and stream the acquired sensor data to the processor 1402 for communication to the base station 1012.

It should be noted that, in some implementations of the devices 1302 and 1402, the operations executed by the processors 1302 and 1402 while under control of respective control of the code 1310 and 1410 may be hardcoded and/or implemented using hardware, rather than as a combination of hardware and software.

Figure 15:
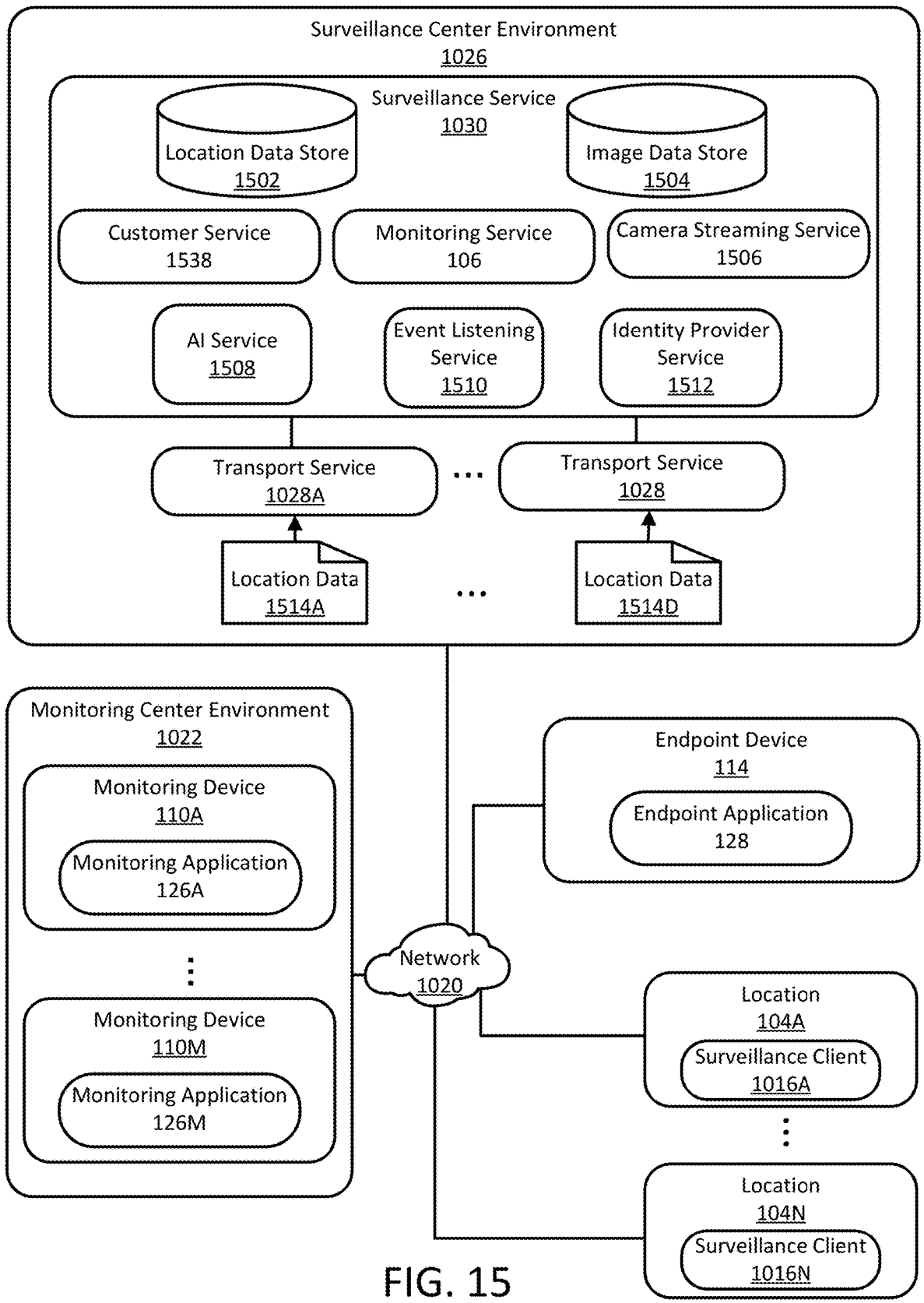
FIG. 15 shows example implementations of the surveillance center environment and the monitoring center environment of the security system shown in FIG. 10, according to some implementations of the present disclosure.

Turning now to FIG. 15, aspects of the surveillance center environment 1026, the monitoring center environment 1022, one of the endpoint devices 114, the network(s) 1020, and a plurality of monitored locations 104A through 104N (collectively referred to as the monitored locations 104) shown in FIG. 10 are schematically illustrated. As shown in FIG. 15, in some implementations, the surveillance service 1030 may include a location data store 1502, an image data store 1504, an artificial intelligence (AI) service 1508, an event listening service 1510, an identity provider service 1512, a customer service 1538, a monitoring service 106, and a camera streaming service 1506. As also shown in FIG. 15, the monitoring center environment 1022 may include multiple monitoring devices 110A through 110M (collectively referred to as the monitoring devices 110) that host or are otherwise configured to access respective monitoring applications 126A through 126M, and individual monitored locations 104A through 104N may include respective surveillance clients 1116A through 1116N (collectively referred to as the surveillance clients 1016), e.g., within base stations 1012 (not shown in FIG. 15) at the various monitored locations 104A through 1102N. As described above in connection with FIGS. 5 and 6, in some implementations, the monitoring applications 126 may be configured to cause the monitoring devices 110 to display screens 502, 602 that enable a monitoring agent 112 to visually monitor activity one or more of the monitored locations 104, as well as engage in an audio dialog with one or more individuals at such locations (e.g., via microphones and speakers of cameras 102 at the monitored locations 104). Further, as additionally shown in FIG. 15, in some implementations, the transport service(s) 1028 may include multiple different transport services 1128A through 1128D configured to receive location data packages, e.g., location data packages 1014A through 1014D, from the surveillance clients 1116A through 616N deployed at the respective monitored locations 104A through 1102N.

The location data store 1502 of the surveillance service 1030 may be configured to store, within a plurality of records, location data in association with identifiers of customers 116 for whom the monitored location 104 is monitored. For example, the location data may be stored in a record with an identifier of a customer 116 and/or an identifier of the monitored location 104 to associate the location data with the customer 116 and the monitored location 104. The image data store 1504 of the surveillance service 1030 may be configured to store, within a plurality of records, one or more frames of image data in association with identifiers of locations and timestamps at which the image data was acquired.

The AI service 1508 of the surveillance service 1030 may be configured to process images and/or sequences of images to identify semantic regions, movement, human faces, and other features within images or a sequence of images. The event listening service 1510 of the surveillance service 1030 may be configured to scan received location data for events and, where an event is identified, execute one or more event handlers to process the event. In some implementations, such event handlers may be configured to identify events and to communicate messages concerning those events to one or more recipient services (e.g., the customer service 1538 and/or the monitoring service 106). Operations that may be performed by the customer service 1538 and/or the monitoring service 106 based on the events identified by the event listening service 1510 are described further below. In some implementations, the event listening service 1510 may interoperate with the AI service 1508 to identify events within image data.

The identity provider service 1512 may be configured to receive authentication requests from the surveillance clients 1016 that include security credentials. When the identity provider 1512 can authenticate the security credentials in a request (e.g., via a validation function, cross-reference lookup, or some other authentication process), the identity provider 1512 may communicate a security token in response to the request. A surveillance client 1016 may receive, store, and include the security token in subsequent packages of location data (e.g., the location data 1014A), so that the recipient transport service (e.g., the transport service 1128A) is able to securely process (e.g., unpack/parse) the packages to extract the location data prior to passing the location data to the surveillance service 1030.

The transport service(s) 1028 of the surveillance center environment 1026 may be configured to receive the location data packages 1514, verify the authenticity of the packages 1514, parse the packages 1514, and extract the location data encoded therein prior to passing the location data to the surveillance service 1030 for processing. The location data that is so processed may include any of the location data types described above with reference to FIG. 10. In some implementations, individual transport services 1028 may be configured to process location data packages 1514 generated by location-based monitoring equipment of particular manufacturers and/or models. The surveillance clients 1016 may be configured to generate and communicate, e.g., to the surveillance service 1030 via the network(s) 1020, packages of location data (e.g., the location data packages 1514) based on sensor information received at the monitored locations 104.

The monitoring service 106 may maintain records concerning the events identified by the event listening service 1510 and may assign individual events to various monitoring agents 112 who are currently on-line with monitoring applications 126. The monitoring application 126 operated by a given monitoring agent 112 may then add the events assigned to that monitoring agent 112 to a queue of events, e.g., within the windows 506 shown in FIG. 1, for review by that monitoring agent 112. In some implementations, a given monitoring application 126 may use data describing the events within its queue to retrieve location data and/or image data (from the location data store 1502 and/or the image data store 1504, respectively) for presentation within or in association with the windows 506.

In response to the monitoring agent 112 identifying a particular event to review (e.g., by clicking on one of the windows 506), the monitoring service 106 may interact with the camera streaming service 1506 to obtain access credentials to enable the establishment of peer-to-peer connections with one or more cameras 102 at the monitored location 104 corresponding to the event, and to review live video and/or audio streamed from those cameras, e.g., within the windows 604 and/or the main viewer window 606 shown in FIG. 6, as well as to verbally communicate in real time with one or more individuals in the vicinity of the camera(s) 102. Example interactions amongst components of the security system 1000 to enable the streaming of video and/or audio data between the camera(s) 102 at the monitored location 104 and the monitoring application 126 operated by the monitoring agent 112 are described below in connection with FIGS. 17 and 18.

Figure 16:
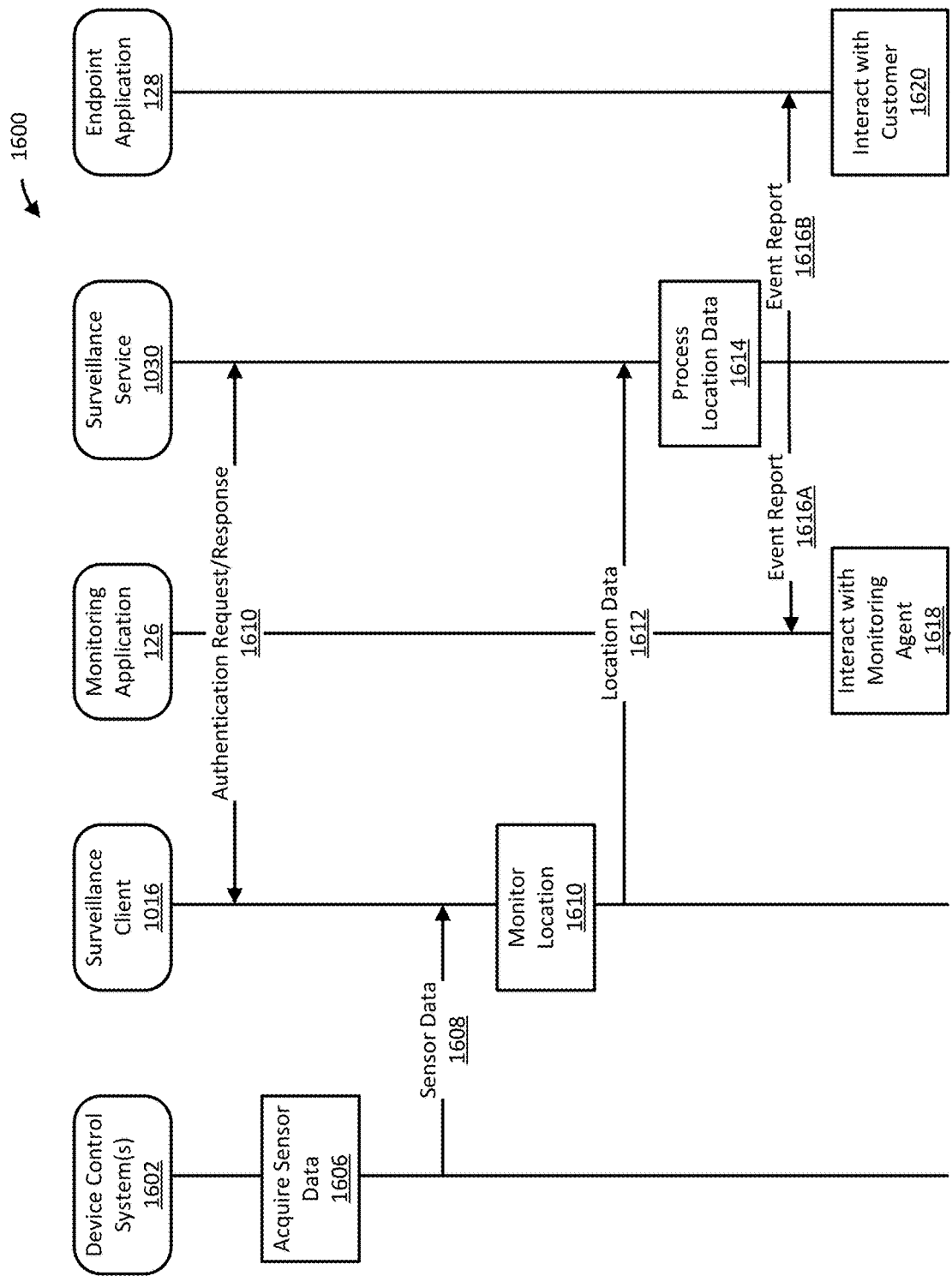
FIG. 16 is a sequence diagram of a monitoring process that may be performed by components of the security system shown in FIG. 10, according to some implementations of the present disclosure.

Turning now to FIG. 16, an example monitoring process 1600 that may be employed by the security system 1000 is illustrated as a sequence diagram. In particular, in some implementations, various portions of the process 1600 may be executed by (A) one or more location-based devices (e.g., the devices 102A, 102B, 1006, 1008, and 1014 of FIG. 10) under the control of device control system (DCS) code (e.g., either the code 1310 or 1410) implemented by at least one processor (e.g., either of the processors 1302 or 1402 of FIG. 13 or 14); (B) a base station (e.g., the base station 1012 of FIG. 10) under control of a surveillance client (e.g., the surveillance client 1016 of FIG. 10); (C) a monitoring center environment (e.g., the monitoring center environment 1022 of FIG. 10) under control of a monitoring application (e.g., the monitoring application 126 of FIG. 10); (D) a surveillance center environment (e.g., the surveillance center environment 1026 of FIG. 10) under control of a surveillance service (e.g., the surveillance service 1030 of FIG. 10); and (E) an endpoint device (e.g., the endpoint device 114 of FIG. 10) under control of a endpoint application (e.g., endpoint application 128 of FIG. 10).

As shown in FIG. 16, the process 1600 may begin with the surveillance client 1016 authenticating with the surveillance service 1030 by exchanging one or more authentication requests and responses 1604 with the surveillance service 1030. More specifically, in some implementations, the surveillance client 1016 may communicate an authentication request to the surveillance service 1030 via one or more API calls to the surveillance service 1030. In such implementations, the surveillance service 1030 may parse the authentication request to extract security credentials therefrom and pass such security credentials to an identity provider (e.g., the identity provider service 1512 of FIG. 15) for authentication. In some implementations, upon the identity provider authenticating the security credentials, the surveillance service 1030 may generate a security token and communicate that security token as a payload within an authentication response to the authentication request. In such implementations, if the identity provider is unable to authenticate the security credentials, the surveillance service 1030 may instead generate an error (e.g., an error code) and communicate that error as the payload within the authentication response to the authentication request. Upon receipt of the authentication response, the surveillance client 1016 may parse the authentication response to extract the payload. If the payload includes the error code, the surveillance client 1016 may retry authentication and/or interoperate with a user interface of its host device (e.g., the user interface 1214 of the base station 1012 of FIG. 12) to render output indicating the authentication failure. If the payload includes the security token, the surveillance client 1016 may store the security token for subsequent use in communication of location data. It should be noted that, in some implementations, the security token may have a limited lifespan (e.g., one hour, one day, one week, one month, etc.) after which the surveillance client 1016 may be required to reauthenticate with the surveillance service 1030.

Continuing with the process 1600, one or more device control systems 1602 hosted by one or more location-based devices may acquire (1606) sensor data descriptive of a location (e.g., the monitored location 104 of FIG. 10). The sensor data that is so acquired may be any of a variety of types, as discussed above with reference to FIGS. 10-15. In some implementations, one or more of the device control systems 1602 may acquire sensor data continuously. In other implementations, one or more of the DCSs 1602 may additionally or alternatively acquire sensor data in response to an event, such as expiration of a timer (a push event) or receipt of an acquisition polling signal communicated by the surveillance client 1016 (a poll event). In some implementations, one or more of the device control systems 1602 may stream sensor data to the surveillance client 1016 with minimal processing beyond acquisition and digitization. In such implementations, the sensor data may constitute a sequence of vectors with individual vector members including, for example, a sensor reading and a timestamp. In some implementations, one or more of the device control systems 1602 may execute additional processing of sensor data, such as generation of one or more summaries of multiple sensor readings. Further still, in some implementations, one or more of the device control systems 1602 may execute sophisticated processing of sensor data. For example, if the sensor(s) 1422 of a sensor assembly 1424 (shown in FIG. 14) include an image capture device, the device control system 1602 may execute image processing routines such as edge detection, motion detection, facial recognition, threat assessment, event generation, etc.

Continuing with the process 1600, the device control component(s) 1602 may communicate the sensor data 1608 to the surveillance client 1016. As with sensor data acquisition, the device control system(s) 1602 may communicate the sensor data 1608 continuously or in response to an event, such a push event (originating with the device control system(s) 1602) or a poll event (originating with the surveillance client 1016).

Continuing with the process 1600, the surveillance client 1016 may monitor (1610) the monitored location 104 by processing the received sensor data 1608. In some implementations, for example, the surveillance client 1016 may execute one or more image processing routines. Such image processing routines may include any of the image processing routines described above with reference to the operation 1606. By distributing at least some of the image processing routines between the device control system(s) 1602 and surveillance client 1016, the amount of power consumed by battery-powered devices may be decreased by off-loading processing to line-powered devices. Moreover, in some implementations, the surveillance client 1016 may execute an ensemble threat detection process that utilizes sensor data 1608 from multiple, distinct device control systems 1602 as input. For instance, in some implementations, the surveillance client 1016 may attempt to corroborate an open state received from a contact sensor with motion and facial recognition processing of an image of a scene including a window or door to which the contact sensor is affixed. If two or more of the three processes indicate the presence of an intruder, a score (e.g., a threat score) may be increased and or a break-in event may be declared, locally recorded, and communicated. Other processing that the surveillance client 1016 may execute includes outputting local alerts (e.g., in response to detection of particular events and/or satisfaction of other criteria) and detection of maintenance conditions for location-based devices, such as a need to change or recharge low batteries and/or replace/maintain the devices that host the device control system(s) 1602. Any of the processes described above within the operation 1610 may result in the creation of location data that specifies the results of such processes.

Continuing with the process 1600, the surveillance client 1016 may communicate the location data 1612 to the surveillance service 1030 (via the transport service(s) 1028).

As with the communication of the sensor data 1608, the surveillance client 1016 may communicate the location data 1612 continuously or in response to an event, such as a push event (originating with the surveillance client 1016) or a poll event (originating with the surveillance service 1030).

Continuing with the process 1600, the surveillance service 1030 may process (1614) the received location data. In some implementations, for example, the surveillance service 1030 may execute one or more of the processes described above with reference to the operations 1606 and/or 1610. In some implementations, the surveillance service 1030 may additionally or alternatively calculate a score (e.g., a threat score) or further refine an existing score using historical information associated with the monitored location 104 identified in the location data and/or other locations geographically proximal to the monitored location 104 (e.g., within the same zone improvement plan (ZIP) code). For instance, in some implementations, if multiple break-ins have been recorded for the monitored location 104 and/or other locations within the same ZIP code, the surveillance service 1030 may increase a score calculated by a device control system 1602 and/or the surveillance client 1016.

In some implementations, the surveillance service 1030 may apply a set of rules and criteria to the location data 1612 to determine whether the location data 1612 includes any events and, if so, communicate an event report 1616A and/or 1616B to the monitoring application 126 and/or the endpoint application 128. In some implementations, for example, the monitoring service 106 may assign one or more events to a particular monitoring agent 112, so that those events will be forwarded to the monitoring application 126 that the monitoring agent 112 is operating, e.g., for presentation within respective windows 506 (shown in FIG. 5). An event may, for example, be an event of a certain type (e.g., break-in) or an event of a certain type that satisfies additional criteria (e.g., movement within a particular zone combined with a threat score that exceeds a threshold value). The event reports 1616A and/or 1616B may have a priority based on the same criteria used to determine whether the event reported therein is reportable or may have a priority based on a different set of criteria or rules.

Continuing with the process 1600, the monitoring application 126 within the monitoring center environment 1022 may interact (1618) with monitoring agents 112 through, for example, one or more GUIs, such as the screens 502 and 602 shown in FIGS. 5 and 6. Such GUIs may provide details and context regarding one or more events.

As shown in FIG. 16, the endpoint application 128 of a endpoint device 114 (e.g., a smartphone, personal computer, or other endpoint device) may likewise interact (1620) with at least one customer through, for example, one or more GUIs. Such GUIs may provide details and context regarding one or more events.

It should be noted that the processing of sensor data and/or location data, as described above with reference to the operations 1606, 1610, and 1614, may be executed by processors disposed within various parts of the security system 1000. In some implementations, the device control system(s) 1602 may execute minimal processing of the sensor data (e.g., acquisition and streaming only) and the remainder of the processing described above may be executed by the surveillance client 1016 and/or the surveillance service 1030. This approach may be helpful to prolong battery runtime of location-based devices. In other implementations, the device control system(s) 1602 may execute as much of the sensor data processing as possible, leaving the surveillance client 1016 and the surveillance service

1030 to execute only processes that require sensor data that spans location-based devices and/or locations. Such an approach may be helpful to increase scalability of the security system 1000 with regard to adding new locations.

The following clauses describe examples of inventive concepts disclosed herein.

Clause 1. A method, comprising: performing, by a computing system, first image processing on image data acquired by a camera at a property to determine at least a first feature of the image data; determining, by the computing system, that the first feature satisfies a first rule; based at least in part on the first feature satisfying the first rule, generating a first vector representing a plurality of characteristics of a first face represented in the image data; determining a second vector representing the plurality of characteristics of a second face of a person; determining that the first vector corresponds to the second vector; and determining that the person is represented in the image data based at least in part on the first vector corresponding to the second vector.

Clause 2. The method of clause 1, further comprising: performing, by the computing system, second image processing on the image data to determine a second feature of the image data, wherein the second feature is different than the first feature; and determining, by the computing system, that the second feature satisfies a second rule, wherein the second rule is different than the first rule; wherein generating the first vector is further based at least in part on the second feature satisfying the second rule.

Clause 3. The method of clause 2, further comprising: performing, by the computing system, third image processing on the image data to determine a third feature of the image data, wherein the third feature is different than the first feature and the second feature; and determining, by the computing system, that the third feature satisfies a third rule, wherein the third rule is different than the first rule and the second rule; wherein generating the first vector is further based at least in part on the third feature satisfying the third rule.

Clause 4. The method of any of clauses 1-3, wherein: the first feature comprises an estimated distance between the camera and the person; and the first rule is that the estimated distance be less than a threshold distance.

Clause 5. The method of any of clauses 1-3, wherein: the first feature comprises an estimated distance between the camera and the first face; and the first rule is that the estimated distance be less than a threshold distance.

Clause 6. The method of any of clauses 1-3, wherein: the first feature comprises a location of the person relative to a boundary line of the property; and the first rule is that the person be within the boundary line.

Clause 7. The method of any of clauses 1-3, wherein: the first feature comprises an estimated age of the person; and the first rule is that the estimated age of the person be above a threshold age.

Clause 8. The method of clause 2 or claim 3, wherein: the first feature comprises an estimated distance between the camera and the person; the first rule is that the estimated distance be than a threshold distance; the second feature comprises a location of the person relative to a boundary line of the property; and the second rule is that the person be within the boundary line.

Clause 9. The method of clause 2 or claim 3, wherein: the first feature comprises an estimated distance between the camera and the first face; the first rule is that the estimated distance be less than a threshold distance; the second feature comprises a location of the person relative to a boundary line of the property; and the second rule is that the person be located within the boundary line.

Clause 10. The method of clause 2 or claim 3, wherein: the first feature comprises an estimated distance between the camera and the person; the first rule is that the estimated distance be less than a threshold distance; the second feature comprises an estimated age of the person; and the second rule is that the estimated age of the person be above a threshold age.

Clause 11. The method of clause 2 or claim 3, wherein: the first feature comprises an estimated distance between the camera and the first face; the first rule is that the estimated distance be less than a threshold distance; the second feature comprises an estimated age of the person; and the second rule is that the estimated age of the person be above a threshold age.

Clause 12. The method of clause 3, wherein: the first feature comprises an estimated distance between the camera and the person; the first rule is that the estimated distance be less than a threshold distance; the second feature comprises a location of the person relative to a boundary line of the property; the second rule is that the person be located within the boundary line; the third feature comprises an estimated age of the person; and the third rule is that the estimated age of the person be above a threshold age.

Clause 13. The method of clause 3, wherein: the first feature comprises an estimated distance between the camera and the first face; the first rule is that the estimated distance be less than a threshold distance; the second feature comprises a location of the person relative to a boundary line of the property; the second rule is that the person be located within the boundary line; the third feature comprises an estimated age of the person; and the third rule is that the estimated age of the person be above a threshold age.

Clause 14. The method of any of clauses 1-13, further comprising: determining that a security system at the property is in an armed state; wherein generating the first vector is further based at least in part on the security system being in the armed state.

Clause 15. The method of any of clauses 1-14, further comprising: determining that a current time is within a window of time for which a security system is configured to perform biometric facial recognition; wherein generating the first vector is further based at least in the current time being within the window of time.

Clause 16. The method of any of clauses 1-15, further comprising: determining that a setting indicates that biometric facial recognition is enabled for the property; wherein generating the first vector is further based at least in part on the setting indicating that biometric facial recognition is enabled for the property.

Clause 17. The method of clause 16, further comprising: determining a geographic region is which the property is located; determining that biometric facial recognition is permitted within the geographic region; and based at least in part on biometric facial recognition being permitted within the geographic region, configuring the setting to indicate that biometric facial recognition is enabled for the property.

Clause 18. The method of clause 17, further comprising: causing an endpoint device to present a user interface to obtain authorization to use biometric facial recognition; and determining that the authorization has been received; wherein configuring the setting to indicate that biometric facial recognition is enabled for the property is further based on receipt of the authorization.

Clause 19. The method of any of clause 1-18, wherein determining that the first vector corresponds to the second vector comprises: determining that the first vector and the second vector are within a threshold degree of similarity.

Clause 20. The method of clause 19, further comprising: receiving, by the computing system, a request to create a profile for the person; determine an email address or phone number for the person; based at least in part on the request, sending, using the email address or phone number, a request to permit use of biometric facial recognition using one or more images of the person; and generating the second vector based at least in part on a response indicative that the use of biometric facial recognition is permitted.

Clause 21. The method of any of clauses 1-20, wherein: the first image processing is performed in response to determining, by the computing system, that the image data represents the first face.

Clause 22. The method of any of clauses 1-21, wherein generating the first vector comprises generating a biometric embedding for the first face.

Clause 23. A method, comprising: determining, by a computing system, that a setting indicates that biometric facial recognition is enabled for a property; generating, by the computing system and based at least in part on the setting indicating that biometric facial recognition is enabled for the property, a first vector representing a plurality of characteristics of a first face represented in image data acquired by a camera at the property; determining a second vector representing the plurality of characteristics of a second face of a person; determining that the first vector corresponds to the second vector; and determining that the person is represented in the image data based at least in part on the first vector corresponding to the second vector.

Clause 24. The method of clause 23, further comprising: determining a geographic region in which the property is located; determining that biometric facial recognition is permitted within the geographic region; and based at least in part on biometric facial recognition being permitted within the geographic region, configuring the setting to indicate that biometric facial recognition is enabled for the property.

Clause 25. The method of clause 24, further comprising: causing an endpoint device to present a user interface to obtain authorization to use biometric facial recognition; and determining that authorization has been received; wherein configuring the setting to indicate that biometric facial recognition is enabled for the property is further based on receipt of the authorization.

Clause 26. The method of any of clause 23-25, wherein determining that the first vector corresponds to the second vector comprises: determining that the first vector and the second vector are within a threshold degree of similarity.

Clause 27. The method of any of clauses 23-26, further comprising: receiving, by the computing system, a request to create a visitor profile for the person; determine an email address or phone number for the person; based at least in part on the request, sending, using the email address or phone number, a request to permit use of biometric facial recognition using one or more images of the person; and generating the second vector based at least in part on a response indicative that the use of biometric facial recognition is permitted.

Clause 28. The method of any of clauses 23-27, wherein generating the first vector comprises generating a biometric embedding for the first face.

Clause 29. A method, comprising: receiving, by a computing system, a request to create a profile for a person; determine an email address or phone number for the person; based at least in part on the request, sending, using the email address or phone number, a request to permit use of biometric facial recognition using one or more images of the person; and generating a vector representing a plurality of characteristics of a face of the person based at least in part on a response indicative that the use of biometric facial recognition is permissible.

Clause 30. A system, comprising: one or more processors; and one or more non-transitory computer-readable mediums encoded with instructions which, when executed by the one or more processors, cause the system to perform the method of any of clauses 1-29.

Clause 31. One or more non-transitory computer-readable mediums encoded with instructions which, when executed by one or more processors of a system, cause the system to perform the method of any of clauses 1-29.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:
determining an identifier of a first geographic region in which a property monitored by a computing system is located;
causing, by a first application executing on a first endpoint device associated with the property, the identifier of the first geographic region to be evaluated against first content of a first datastore to determine that facial recognition processing is permitted within the first geographic region, the first content including identifiers of geographic regions in which facial recognition processing is permitted or is prohibited;
based at least in part on facial recognition processing being permitted within the first geographic region, causing the first endpoint device to present a user interface element that can be toggled between a first state corresponding to disablement of facial recognition for the property and a second state corresponding to enablement of facial recognition processing for the property, wherein the user interface element being in the first state causes the computing system to process image data acquired by a camera at the property to determine that people are represented in the image data but to refrain from performing facial recognition processing on the image data to determine identities of the people;
determining, by the first application, that the user interface element is in the second state; and
based at least in part on the user interface element being in the second state, causing the computing system to perform facial recognition processing on first image data acquired by the camera to determine an identity of at least a first person represented in the first image data.

2. The method of claim 1, further comprising:
generating, by the computing system, a first vector representing a plurality of characteristics of a first face represented in the first image data;
identifying, by the computing system, a second vector representing the plurality of characteristics of a second face represented in second image data, the second face belonging to the first person; and
determining, by the computing system, the identity of the first person based at least in part on the first vector corresponding to the second vector.

3. The method of claim 2, wherein determining that the first vector corresponds to the second vector comprises:
determining that the first vector and the second vector are within a threshold degree of similarity.

4. The method of claim 2, further comprising:
receiving, by the computing system, a first request to create a profile for the first person;
determining, by the computing system, an identifier for the first person;
based at least in part on the first request, causing, by the computing system, a second request to be sent to a second application corresponding to the identifier for the first person, the second request seeking authorization from the first person to use of facial recognition processing using one or more images of the first person;
receiving, by the computing system, a response to the second request, the response indicating that the first person has authorized use of facial recognition processing using one or more images of the first person;
determining, by the computing system, that the second face represented in the second image data belongs to the first person; and
based at least in part on the response and the second face belonging to the first person, generating, by the computing system and using the second image data, the second vector.

5. The method of claim 2, wherein generating the first vector comprises identifying and measuring facial features represented in an image of the first face.

6. The method of claim 2, further comprising:
storing, by the computing system and in a second datastore, first data representing an image of the first face;
based at least in part on the computing system determining the identity of the first person, storing, by the computing system and in the second datastore, second data in association with the first data, the second data indicating that the image of the first face corresponds to the first person; and
based at least in part on the first data and the second data having been stored in the second datastore, causing a second application to output an indication that the image of the first face corresponds to the first person.

7. The method of claim 4, wherein the identifier for the first person comprises an email address or phone number of the first person.

8. The method of claim 4, wherein the first request is received from the first application.

9. The method of claim 1, further comprising:
receiving, by the computing system, second image data acquired by the camera;
processing, by the computing system, the second image data to determine that a second person is represented in the second image data; and
based at least in part on the user interface element being in the first state, refraining from performing facial recognition processing on the second image data to determine an identity of the second person.

10. The method of claim 9, further comprising:
determining, by the computing system, that the user interface element has transitioned to transition from the second state to the first state;
based at least in part on the user interface element having transitioned from the second state to the first state, changing a stored setting of the computing system from a first value to a second value;
performing the facial recognition processing on the first image data based at least in part on the stored setting having the first value; and
refraining from performing the facial recognition processing on the second image data based at least in part on the stored setting having the second value.

11. The method of claim 1, further comprising:
causing, by the first application, the identifier of the first geographic region to be evaluated against second content of a second datastore to determine that consent of a user is needed before performing facial recognition processing within the first geographic region, the second content including of identifiers of geographic regions in which consent is needed or not needed before performing facial recognition processing; and
based at least in part on consent of the user being needed before performing facial recognition processing within the first geographic region, causing the first endpoint device to present the user interface element in the first state.

12. The method of claim 1, further comprising:
causing, by the first application, the identifier of the first geographic region to be evaluated against second content of a second datastore to determine that consent of a user is not needed before performing facial recognition processing within the first geographic region, the second content including of identifiers of geographic regions in which consent is or not needed before performing facial recognition processing; and
based at least in part on consent of the user not being needed before performing facial recognition processing within the first geographic region, causing the first endpoint device to present the user interface element in the second state.

13. A system, comprising:
one or more processors; and
one or more computer-readable mediums encoded with instructions which, when executed by the one or more processors, cause the system to:
determine an identifier of a first geographic region in which a property monitored by the system is located;
cause, by a first application executing on a first endpoint device associated with the property, the identifier of the first geographic region to be evaluated against first content of a first datastore to determine that facial recognition processing is permitted within the first geographic region, the first content including identifiers of geographic regions in which facial recognition processing is permitted or prohibited;
based at least in part on facial recognition processing being permitted within the first geographic region, cause the first endpoint device to present a user interface element that can be toggled between a first state corresponding to disablement of facial recognition processing for the property and a second state corresponding to enablement of facial recognition processing for the property, wherein the user interface element being in the first state causes the system to process image data acquired by a camera at the property to determine that people are represented in the image data but to refrain from performing facial recognition processing on the image data to determine identities of the people;
determine, by the first application, that the user interface element is in the second state; and
based at least in part on the user interface element being in the second state, cause the system to perform facial recognition processing on first image data acquired by the camera to determine an identity of at least a first person represented in the first image data.

14. The system of claim 13, wherein the one or more computer-readable mediums are further encoded with additional instructions which, when executed by the one or more processors, further cause the system to perform facial recognition processing on the first image data at least in part by:
generating a first vector representing a plurality of characteristics of a first face represented in the first image data;
identifying a second vector representing the plurality of characteristics of a second face represented in second image data, the second face belonging to the first person; and
determining the identity of the first person based at least in part on the first vector corresponding to the second vector.

15. The system of claim 14, wherein the one or more computer-readable mediums are further encoded with additional instructions which, when executed by the one or more processors, further cause the system to:
determine that the first vector corresponds to the second vector at least in part by determining that the first vector and the second vector are within a threshold degree of similarity.

16. The system of claim 14, wherein the one or more computer-readable mediums are further encoded with additional instructions which, when executed by the one or more processors, further cause the system to:
receive a first request to create a profile for the first person;
determine an identifier for the first person;
based at least in part on the first request, cause a second request to be sent to a second application corresponding to the identifier for the first person, the second request seeking authorization from the first person to use of facial recognition processing using one or more images of the first person;
receive a response to the second request, the response indicating that the first person has authorized use of facial recognition processing using one or more images of the first person;
determine that the second face represented in the second image data belongs to the first person; and
based at least in part on the response and the second face belonging to the first person, generate using the second image data, the second vector.

17. The system of claim 16, wherein the identifier for the first person comprises an email address or phone number of the first person.

18. The system of claim 16, wherein the first request is received from the first application.

19. The system of claim 14, wherein the one or more computer-readable mediums are further encoded with additional instructions which, when executed by the one or more processors, further cause the system to:
generate the first vector at least in part by identifying and measuring facial features represented in an image of the first face.

20. The system of claim 14, wherein the one or more computer-readable mediums are further encoded with additional instructions which, when executed by the one or more processors, further cause the system to:
store, in a second datastore, first data representing an image of the first face;
based at least in part on the identity of the first person being determined, store, in the second datastore, second data in association with the first data, the second data indicating that the image of the first face corresponds to the first person; and
based at least in part on the first data and the second data having been stored in the second datastore, cause a second application to output an indication that the image of the first face corresponds to the first person.

21. The system of claim 13, wherein the one or more computer-readable mediums are further encoded with additional instructions which, when executed by the one or more processors, further cause the system to:
receive second image data acquired by the camera;
process the second image data to determine that a second person is represented in the second image data; and
based at least in part on the user interface element being in the first state, refrain from performing facial recognition processing on the second image data to determine an identity of the second person.

22. The system of claim 21, wherein the one or more computer-readable mediums are further encoded with additional instructions which, when executed by the one or more processors, further cause the system to:
- determine that the user interface element has transitioned from the second state to the first state;
- based at least in part on the user interface element having transitioned from the second state to the first state, change a stored setting of the system from a first value to a second value;
- perform the facial recognition processing on the first image data based at least in part on the stored setting having the first value; and
- refrain from performing the facial recognition processing on the second image data based at least in part on the stored setting having the second value.

23. The system of claim 13, wherein the one or more computer-readable mediums are further encoded with additional instructions which, when executed by the one or more processors, further cause the system to:
- cause, by the first application, the identifier of the first geographic region to be evaluated against second content of a second datastore to determine that consent of a user is needed before performing facial recognition processing within the first geographic region, the second content including of identifiers of geographic regions in which consent is needed or not needed before performing facial recognition processing; and
- based at least in part on consent of the user being needed before performing facial recognition processing within the first geographic region, cause the first endpoint device to present the user interface element in the first state.

24. The system of claim 13, wherein the one or more computer-readable mediums are further encoded with additional instructions which, when executed by the one or more processors, further cause the system to:
- cause, by the first application, the identifier of the first geographic region to be evaluated against second content of a second datastore to determine that consent of a user is not needed before performing facial recognition processing within the first geographic region, the second content including of identifiers of geographic regions in which consent is needed or not needed before performing facial recognition processing; and
- based at least in part on consent of the user not being needed before performing facial recognition processing within the first geographic region, cause the first endpoint device to present the user interface element in the second state.

\* \* \* \* \*